US012756092B2

(12) United States Patent
Liu et al.

(10) Patent No.: US 12,756,092 B2
(45) Date of Patent: Oct. 6, 2026

(54) PHASE SHIFTER, BASE STATION ANTENNA, AND BASE STATION

(71) Applicant: Huawei Technologies Co., Ltd., Shenzhen (CN)

(72) Inventors: Xinming Liu, Xi'an (CN); Xiangcai Meng, Dongguan (CN); Gengfei Wu, Shenzhen (CN); Lan Yao, Dongguan (CN); Yongzhan Chen, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/089,503

(22) Filed: Mar. 25, 2025

(65) Prior Publication Data

US 2025/0226577 A1 Jul. 10, 2025

Related U.S. Application Data

(63) Continuation of application No. PCT/CN2023/117726, filed on Sep. 8, 2023.

(30) Foreign Application Priority Data

Sep. 26, 2022 (CN) ......................... 202211177548.4

(51) Int. Cl.

| | |
|---|---|
| ***H01Q 3/04*** | (2006.01) |
| ***H01Q 1/24*** | (2006.01) |
| ***H01Q 13/08*** | (2006.01) |

(52) U.S. Cl.

CPC ............... *H01Q 3/04* (2013.01); *H01Q 1/246* (2013.01); *H01Q 13/08* (2013.01)

(58) Field of Classification Search

None

See application file for complete search history.

(56) References Cited

U.S. PATENT DOCUMENTS

| | | | | |
|---|---|---|---|---|
| 8,841,977 | B2 * | 9/2014 | Jung | H01P 1/184 333/156 |
| 11,476,574 | B1 * | 10/2022 | Abdelmonem | H01Q 3/2694 |
| 2006/0273864 | A1 | 12/2006 | Zimmerman et al. | |
| 2018/0316075 | A1 * | 11/2018 | Liao | H01P 1/183 |
| 2021/0013605 | A1 * | 1/2021 | Jang | H01Q 3/32 |
| 2022/0037753 | A1 * | 2/2022 | Tang | H01Q 19/10 |
| 2022/0384948 | A1 * | 12/2022 | Udagave | H01Q 3/36 |

(Continued)

FOREIGN PATENT DOCUMENTS

| | | | |
|---|---|---|---|
| CN | 106921011 | A | 7/2017 |
| CN | 109193161 | A | 1/2019 |

(Continued)

*Primary Examiner* — Wilson Lee

(74) *Attorney, Agent, or Firm* — Slater Matsil, LLP

(57) ABSTRACT

In accordance with an embodiment, a system includes a phase shifter having a substrate, a coupling structure, a main feeder, and at least one strip line. The coupling structure has an arc-shaped coupling surface. One end of the main feeder is electrically connected to the coupling surface, and another end of the main feeder is a signal input end. The signal input end is configured to receive a first electrical signal. The strip line has an arc-shaped segment and two signal output ends, and the signal output ends are configured to output second electrical signals.

20 Claims, 13 Drawing Sheets

(56) References Cited

U.S. PATENT DOCUMENTS

| | | | | |
|---|---|---|---|---|
| 2023/0139300 | A1* | 5/2023 | Udagave .................. | H01Q 3/32<br>342/368 |
| 2023/0307831 | A1* | 9/2023 | Li ............................ | H01Q 3/32 |
| 2026/0088495 | A1* | 3/2026 | Schiesser ................. | H01Q 3/32 |

FOREIGN PATENT DOCUMENTS

| | | | |
|---|---|---|---|
| CN | 106486721 | B | 4/2021 |
| CN | 216251043 | U | 4/2022 |
| KR | 102016088 | B1 | 8/2019 |
| WO | 2022072227 | A1 | 4/2022 |

* cited by examiner

PHASE SHIFTER, BASE STATION ANTENNA, AND BASE STATION

CROSS-REFERENCE TO RELATED APPLICATIONS

This application is a continuation of International Application No. PCT/CN2023/117726, filed on Sep. 8, 2023, which claims priority to Chinese Patent Application No. 202211177548.4, filed on Sep. 26, 2022. The disclosures of the aforementioned applications are hereby incorporated by reference in their entireties.

TECHNICAL FIELD

This application relates to the field of antenna technologies, and in particular, to a phase shifter, a base station antenna, and a base station.

BACKGROUND

With development of mobile communication, usage of mobile terminals is increasingly high, and network coverage of a mobile cellular network is a key to mobile communication. A key device of the mobile cellular network is a base station antenna. To meet different network coverage requirements, the base station antenna usually uses a remote electrical tilt system. As geographical environments and electromagnetic radiation environments become increasingly complex, requirements for performance of the base station antenna in terms of indicators such as a high gain and a low side lobe are increasingly high. To change a coverage area of the base station antenna and optimize a signal coverage region of the antenna, a signal radiation tilt angle of the base station antenna is usually changed. Currently, most mainstream base station antennas are base station antennas whose radiation tilt angles can be adjusted. For signal coverage adjustment, a phase distribution of an antenna array is changed by using a phase shifter, to adjust a radiation pattern of the antenna, thereby adjusting signal coverage.

The phase shifter is a core component of the base station antenna, and performance of the phase shifter directly determines performance of the base station antenna, thereby affecting quality of network optimization and signal coverage of mobile communication. Currently, mainstream phase shifters of base station antennas include a dielectric phase shifter, a physical phase shifter, and a digital phase shifter. The physical phase shifter is widely used in base station antennas due to features such as a small size and a large phase shift amount. With development of technologies, requirements for sizes and costs of phase shifters are increasingly high, and miniaturization and lightweight become important objectives of the base station antenna.

SUMMARY

This application provides a phase shifter, a base station antenna, and a base station, to improve phase difference symmetry of a phase shifter.

According to a first aspect, this application provides a phase shifter, which may be used in an antenna feeding network to change a radiation direction of an antenna array. The phase shifter includes a phase shifter component and a swing arm component, and the swing arm component is rotatably mounted on the phase shifter component. The phase shifter component includes a substrate and a coupling surface, a main feeder, and a strip line that are disposed on the substrate. The coupling surface, the main feeder, and the strip line form a main circuit of the phase shifter component. One end of the main feeder is electrically connected to the coupling surface, another end of the main feeder is a signal input end, and the signal input end is configured to receive a first electrical signal. The strip line has an arc-shaped segment and two signal output ends located at two ends of the strip line, and the signal output ends are configured to output second electrical signals. The swing arm component is rotatably mounted on the substrate, and the swing arm component may rotate around a rotation center on a surface parallel to the substrate. One end of the swing arm component is electrically connected to the coupling surface, and another end of the swing arm component is electrically connected to the arc-shaped segment of the strip line, so that electrical signal transmission between the coupling surface and the strip line can be implemented. During working, the first electrical signal is input from the signal output end, and reaches each strip line through the main feeder, the coupling surface, and the swing arm component, and the second electrical signals are respectively output from the two signal output ends of the strip line. For the strip line, compared with a phase of the first electrical signal received by the signal input end, phase changes of the second electrical signals output by the two signal output ends have an equal magnitude and are in opposite directions. That is, a difference between the second electrical signals output by the two signal output ends of each strip line is symmetric. This can improve difference symmetry of the phase shifter. When the phase shifter is used in a base station antenna, electrical performance of the base station antenna can be improved.

In a process of transmitting an electrical signal on the coupling surface, the electrical signal arrives at the swing arm component through two different paths. When the swing arm component rotates relative to the rotation center, transmission of the electrical signal on the two paths on the coupling surface causes different phase changes, resulting in phase asymmetry. To compensate for a phase change difference of the electrical signal at the coupling surface, a structure of the strip line may be improved.

In a possible implementation, the arc-shaped segment of the strip line is distributed in a serpentine structure. A path length of the arc-shaped segment in a unit center angle gradually increases or decreases in an arc extension direction of the arc-shaped segment. In a process in which the swing arm component swings relative to the coupling surface, line lengths of the arc-shaped segment through which the swing arm component swings by a same center angle are different, so that paths from the swing arm component to the two signal output ends can be changed, that is, the phase changes of the second signals output by the two signal output ends are different. During application, distribution of the arc-shaped segment of the strip line is adjusted according to a requirement, to compensate for a phase change difference generated by the electrical signal at the coupling surface, and ensure that a phase difference between the second electrical signals output by the two second signal output ends is symmetric.

Possibly, a bending depth of the serpentine structure of the arc-shaped segment is even, and a spacing of the serpentine structure of the arc-shaped segment gradually increases or decreases in the arc extension direction of the arc-shaped segment.

Possibly, a spacing of the serpentine structure of the arc-shaped segment is even, and a bending depth of the serpentine structure of the arc-shaped segment gradually increases or decreases in the arc extension direction of the arc-shaped segment.

In another possible implementation, a dielectric layer is disposed between the strip line and the substrate. A dielectric constant of the dielectric layer gradually increases or decreases in the arc extension direction of the arc-shaped segment. When an electrical signal is transmitted on the strip line, the electrical signal is affected by the dielectric constant of the dielectric layer. Therefore, dielectric constants of materials at different positions of the dielectric layer may be set differently, so that a phase change difference of the electrical signal at the coupling surface can be compensated in a process of propagation of the electrical signal on the strip line. Finally, a phase change of a second electrical signal output by a first signal output end and a phase change of a second electrical signal output by a second signal output end have an equal magnitude and are in opposite directions.

During actual application, the phase change of the electrical signal may be changed only by adjusting distribution density of the arc-shaped segment of the strip line, or the phase change of the electrical signal may be changed only by changing the dielectric constant of the dielectric layer, or the phase change of the electrical signal may be changed by adjusting both distribution density of the arc-shaped segment of the strip line and the dielectric constant of the dielectric layer.

To reduce a size of the phase shifter, the signal input end may be disposed to be on a same side as one of the signal output ends. Space on both sides of the coupling surface is used to reduce a dimension of the phase shifter in a radial direction of the arc-shaped segment.

Possibly, a center phase output line is further disposed on the substrate. One end of the center phase output line is connected to the coupling surface, and another end on the coupling surface is a center phase output end. The center phase output end is electrically connected to the main feeder through the coupling surface, and a phase of an electrical signal output by the center phase output end is almost the same as the phase of the first electrical signal received by the signal input end.

The center phase output end may be disposed on a side that is of the coupling surface and that is away from the signal input end, that is, positions of the center phase output end and the signal input end are symmetrical with respect to the coupling surface. When the signal input end is located on a side of one of the signal output ends, the center phase output end is located on a side of the other of the signal output ends. This also helps reduce the size of the phase shifter.

In some possible implementations, a lightning protection circuit is disposed on the coupling surface and/or the center phase output line, to avoid a strike from a pulse current such as thunder or the like. In addition, in some possible applications, a filter circuit may be further disposed on the main feeder, to perform filtering processing on the input first electrical signal, so as to suppress power energy on another non-operating band.

In some possible implementations, there are at least two strip lines, the strip lines are all located on a same side of the coupling surface, and arc-shaped segments of the strip lines have different radii. Between any two adjacent strip lines, a path length of an arc-shaped segment close to the coupling surface is greater than a path length of an arc-shaped segment away from the coupling surface. A longer strip line is bent by using a serpentine structure of an arc-shaped segment and arranged on a side that is of the substrate and that is close to a circle center, so that space occupied by the strip line is reduced, and a size of the phase shifter component may also be reduced.

Specifically, the swing arm component includes a coupling swing arm and a coupling circuit disposed on a side that is of the coupling swing arm and that faces the substrate. The coupling swing arm is rotatably mounted on the substrate, a rotation center of the coupling swing arm is coaxial with a circle center of the coupling surface, and the rotation center of the coupling swing arm passes through the circle center of the coupling surface and is perpendicular to the substrate. One end of the coupling circuit is electrically connected to the coupling surface, and another end of the coupling circuit is electrically connected to an arc-shaped segment of each strip line.

The coupling circuit is capacitively coupled to the coupling surface, and the coupling circuit is also capacitively coupled to the strip line. The coupling circuit and the strip line are used as an example. An insulation layer is disposed on a surface that is of the coupling circuit and that faces the strip line and/or a surface that is of the strip line and that faces the coupling circuit.

The coupling swing arm is rotatably mounted on the substrate by using a central shaft. The central shaft is coaxially fastened to the substrate and is coaxial with the circle center of the coupling surface, and the coupling swing arm is rotatably mounted on the central shaft. When the coupling swing arm rotates around the central shaft, the coupling swing arm can change a position for an electrical connection with the arc-shaped segment of the strip line.

In a possible implementation, there are a plurality of phase shifter components, the plurality of phase shifter components are stacked in a first direction, and the first direction is perpendicular to the substrate. There are a plurality of swing arm components, and one swing arm component is mounted on each phase shifter component in a one-to-one correspondence. This structure is equivalent to a combination of a plurality of phase shifters in the first direction.

When swing arm components in the plurality of phase shifters have consistent motion statuses, the swing arm components may be relatively fastened. In this case, the plurality of swing arm components may be simultaneously driven to rotate by using one driving force.

According to a second aspect, this application further provides a phase shifter, which may be used in an antenna feeding network to change a radiation direction of an antenna array. The phase shifter includes a phase shifter component and a swing arm component, and the swing arm component is rotatably mounted on the phase shifter component. The phase shifter component includes a substrate and a dielectric layer disposed on the substrate. A coupling surface, a main feeder, and at least one strip line are disposed on a surface of the dielectric layer. The coupling surface, the main feeder, and the at least one strip line form a main circuit of the phase shifter component. One end of the main feeder is electrically connected to the coupling surface, another end of the main feeder is a signal input end, and the signal input end is configured to receive a first signal. Each strip line has an arc-shaped segment and two signal output ends located at two ends of the strip line, and the signal output ends are configured to output second electrical signals. The swing arm component is rotatably mounted on the substrate, a rotation center of the swing arm component is coaxial with a circle center of the arc-shaped segment, and the swing arm component may rotate around a rotation center on a surface parallel to the substrate. One end of the swing arm component is electrically connected to the coupling surface, and another end of the swing arm component is electrically connected to the arc-shaped segment of the strip line, so that electrical signal transmission between the coupling surface and the strip line can be implemented. During working, the first electrical signal is input from the signal output end, and reaches each strip line through the main feeder, the coupling surface, and the swing arm component, and the second electrical signals are respectively output from the two signal output ends of the strip line. A dielectric constant of the dielectric layer varies in an extension direction of the arc-shaped segment. When an electrical signal is transmitted on the strip line, the electrical signal is affected by the dielectric constant of the dielectric layer. The dielectric constant of the dielectric layer may be designed in a differentiated manner according to a requirement, to compensate for a phase change difference generated by an electrical signal on the coupling surface, so that the second electrical signals output by the two signal output ends of each strip line have an equal magnitude and are in opposite directions compared with the first electrical signal.

According to a third aspect, this application further provides a base station antenna, including a radiating element, a radio frequency processing unit, an adjustment unit, and the foregoing phase shifter. There are a plurality of radiating elements. The signal output ends in the phase shifter are configured to be connected to the radiating elements in a one-to-one correspondence, and the adjustment unit is configured to drive the swing arm component to rotate around a rotation center. Because the phase shifter has relatively good difference symmetry, a phase error brought to the base station antenna can be reduced, and a feeding phase requirement of the antenna array can be met. In this way, a beamforming effect of the base station antenna is improved, and directivity and a gain of the base station antenna are improved, so that the base station antenna can meet a signal coverage requirement. When the signal input end is disposed on a side of any signal output end, the base station antenna can implement component miniaturization.

In some possible implementations, the base station antenna further includes a functional module, and the functional module is disposed between the phase shifter and the radio frequency processing unit to extend performance of the antenna. The functional module may include one or a combination of at least two of a combiner, a filter, and a microwave circuit.

According to a fourth aspect, this application further provides a base station, including a pole, a baseband processing unit, and the foregoing base station antenna. The base station antenna is fastened to the pole, and the base station antenna is electrically connected to the baseband processing unit through a radio frequency processing unit.

DETAILED DESCRIPTION OF ILLUSTRATIVE EMBODIMENTS

Embodiments of this application provide a phase shifter, a base station antenna, and a base station, to resolve a problem that phases of electrical signals at two signal output ends of a phase shifter are asymmetric. To make the objectives, technical solutions, and advantages of this application clearer, the following further describes this application in detail with reference to the accompanying drawings.

The terms used in the following embodiments are merely used for describing specific embodiments, and are not intended to limit this application. The singular forms "one", "a", "the", "the foregoing", "this", and "the one" used in this specification and the appended claims of this application are also intended to include forms such as "one or more", unless otherwise clearly specified in the context.

Figure 1:
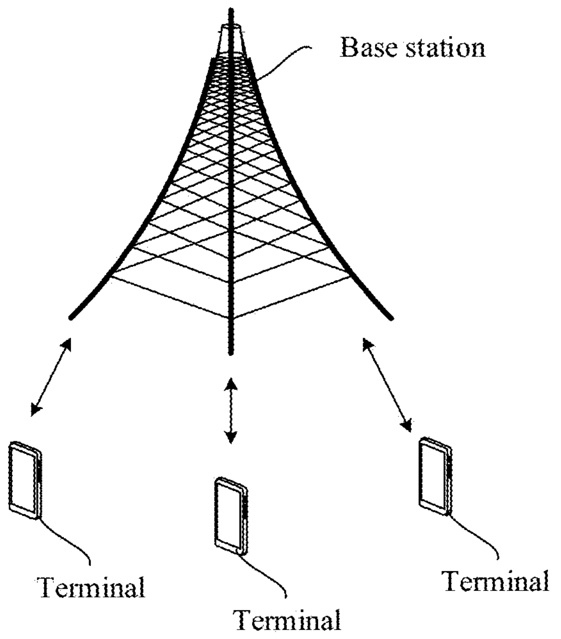
FIG. 1 is a diagram of a principle of a base station according to an embodiment of this application.

Reference to "an embodiment", "some embodiments", or the like described in this specification means that specific features, structures, or characteristics described with reference to the embodiment are included in one or more embodiments of this application. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "contain", "have", and variations thereof all mean "including but not limited to", unless otherwise specifically emphasized in another manner. FIG. 1 is an example of a diagram of a system architecture to which an embodiment of this application is applicable. As shown in FIG. 1, the system architecture may include a base station and a terminal. Wireless communication may be implemented between the base station and the terminal. The base station may also be referred to as an access network device, may be located in a base station subsystem (BBS), a terrestrial radio access network (UTRAN), or an evolved terrestrial radio access network (E-UTRAN), and is configured to perform cell coverage of a signal to implement communication between a terminal device and a wireless network. Specifically, the base station may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB or eNodeB) in a long term evolution (LTE) system, or may be a radio controller in a cloud radio access network (CRAN) scenario. Alternatively, the base station may be a relay station, an access point, a vehicle-mounted device, a wearable device, a g node (gNodeB or gNB) in a new radio (NR) system, an access network device in a future evolved network, or the like. This is not limited in embodiments of this application.

Figure 2:
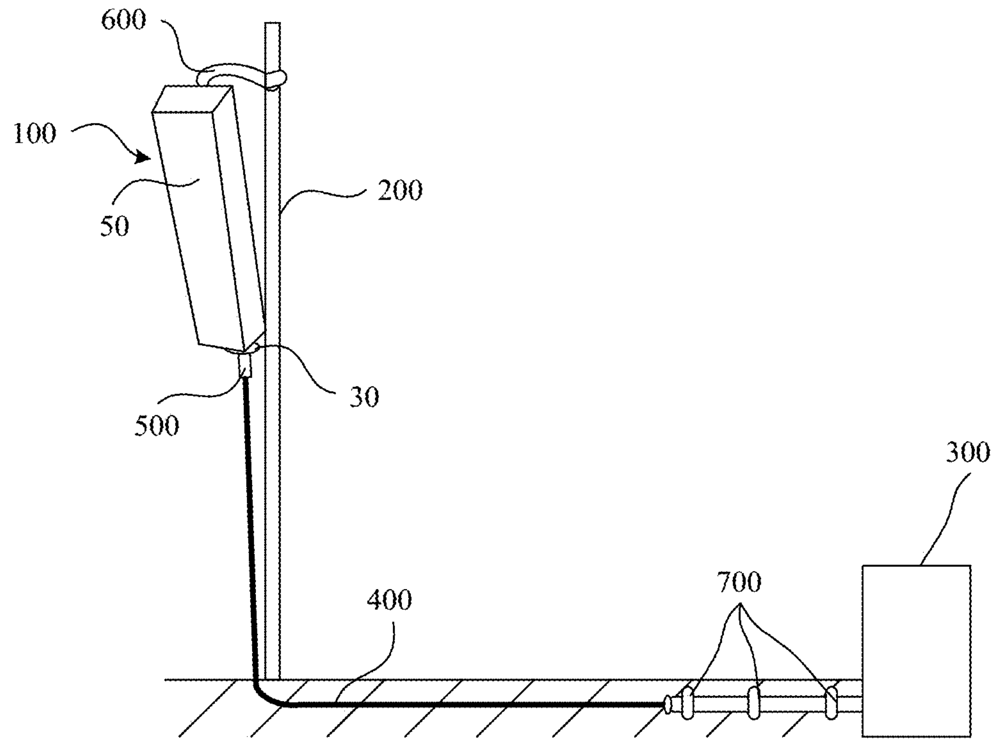
FIG. 2 is a diagram of a structure of a base station according to an embodiment of this application.

The base station is configured with an antenna to implement signal transmission in space. FIG. 2 is a diagram of an application scenario of an antenna configured for the base station shown in FIG. 1. FIG. 2 shows structures such as a pole 200 and a base station antenna 100. The base station antenna 100 includes a radome 50. The base station antenna 100 is fastened to the pole 200 or a tower by using the radome, so that the base station antenna 100 receives or transmits a signal. The radome 50 has a good electromagnetic wave penetration characteristic in terms of electrical performance, and can withstand impact of an external harsh environment in terms of mechanical performance, so that an antenna system can be protected from impact of the external environment.

The base station may further include a radio frequency processing unit 500 and a baseband processing unit 300. The baseband processing unit 300 may be connected to the base station antenna 100 through the radio frequency processing unit 500. In some embodiments, the radio frequency processing unit 500 may also be referred to as a remote radio unit (RRU), and the baseband processing unit 300 may also be referred to as a baseband unit (BBU).

The pole 200 is fastened to the ground and is at a specific height from the ground. The base station antenna 100 is fastened to the pole 200, so that a radiation distance requirement of the antenna can be met. The base station antenna 100 is specifically detachably fastened to the pole 200 through an adjustment bracket 600, so that the base station antenna 100 receives or transmits a signal. In a direction perpendicular to a height direction of the pole 200, an orientation of the base station antenna 100 may be adjusted by using the adjustment bracket 600.

In a possible embodiment, as shown in FIG. 2, the radio frequency processing unit 500 and the base station antenna 100 may be integrally disposed, and the baseband processing unit 300 is located at a remote end of the base station antenna 100. In this case, the radio frequency processing unit 500 and the base station antenna 100 may be collectively referred to as an active antenna unit (AAU). It should be noted that FIG. 2 is merely an example of a location relationship between the radio frequency processing unit 500 and the base station antenna 100. In some other embodiments, both the radio frequency processing unit 500 and the baseband processing unit 300 may be located at a remote end of the base station antenna 100. The radio frequency processing unit 500 and the baseband processing unit 300 may be connected through a connecting wire 400.

A grounding apparatus 700 is disposed between the baseband processing unit 300 and the connecting wire 400, and the grounding apparatus 700 usually includes a grounding electrode buried underground. A sealing piece may be disposed at a joint between the base station antenna 100 and the connecting wire 400, and a sealing piece may also be disposed at a joint between the grounding apparatus 700 and the connecting wire 400. The sealing piece may specifically include at least one of an insulation sealing tape and a polyvinyl chloride (PVC) insulation tape. Certainly, the sealing piece may alternatively be of another structure, and is not limited to a form of an adhesive tape.

Figure 3:
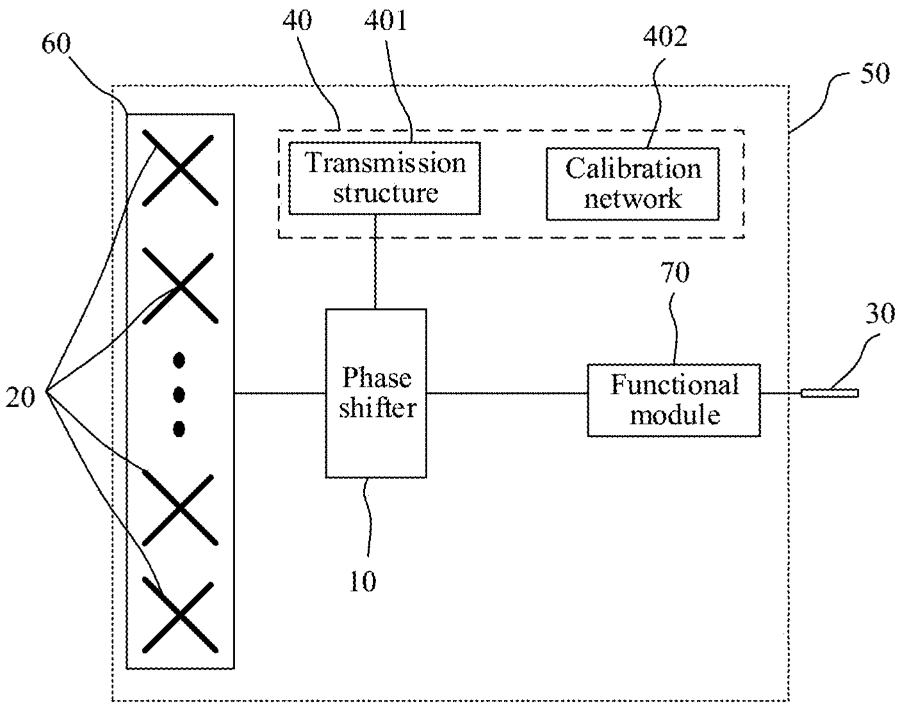
FIG. 3 is a diagram of a structure of a base station antenna according to an embodiment of this application.

Further, FIG. 3 is a diagram of a structure of a base station antenna 100 according to a possible embodiment of this application. As shown in FIG. 3, the base station antenna 100 may include a radiating element 20 and a reflection board 60. The radiating element 20 may also be referred to as an antenna element, an element, or the like. The radiating element 20 is a unit that forms a basic structure of an antenna array, and can effectively radiate or receive an antenna signal. Frequencies of different radiating elements 20 may be the same or different. The reflection board 60 may also be referred to as a baseplate, an antenna panel, a metal reflective surface, or the like. The reflection board 60 may reflect and aggregate received signals on a reception point. The radiating element 20 is usually placed on one side of the reflection board 60. This not only can greatly enhance a signal reception or transmission capability, but also can block and shield an interference signal from a rear surface of the reflection board 60. In this application, the rear surface of the reflection board 60 means a side opposite to the side that is of the reflection board 60 and that is used to dispose the radiating element 20. The base station antenna 100 is connected to the radio frequency processing unit 500 through an antenna connector 30 located outside the radome 50.

In the base station antenna 100, a feeding network is provided between the radiating element 20 and the antenna connector 30. The feeding network may provide a specific power and phase for the radiating element 20. As shown in FIG. 3, the feeding network may include an adjustment unit 40 and a phase shifter 10. The adjustment unit 40 is configured to implement different radiation beam directions, and the phase shifter 10 is configured to change a maximum direction of signal radiation. The phase shifter 10 correspondingly adjusts a corresponding radiating element 20, so that an electrical downtilt angle of a radiated signal of each radiating element 20 may be changed, to change a radiation direction of each radiating element 20, thereby meeting a signal coverage requirement.

As shown in FIG. 3, a functional module 70 may be further disposed between the phase shifter 10 and the antenna connector 30. The functional module 70 may extend performance of the antenna. For example, the functional module 70 may include one or a combination of at least two of a combiner, a power splitter, a filter, and a microwave circuit. The combiner or power splitter can be used in a forward or reverse direction to split one signal into a plurality of signals or combine a plurality of signals into one signal. The filter may be configured to filter out an interference signal. In some cases, the phase shifter 10 further has a function of a power splitter or a combiner. In this case, the power splitter or the combiner may be omitted in the feeding network. Different components included in the feeding network may be connected to each other by using a transmission line and a connector. It should be noted that the power splitter or the combiner may be located inside or outside the radome 50, and connection relationships between different components mentioned above are not unique. FIG. 3 shows only examples of two possible position relationships and connection manners of the components. The adjustment unit 40 may specifically include a transmission structure 401 and a calibration network 402. The transmission structure 401 may drive the phase shifter 10 to change directions of different radiation beams. The calibration network 402 sends a calibration signal to the transmission structure 401 to control the transmission structure 401 to perform an action.

Figure 4A:
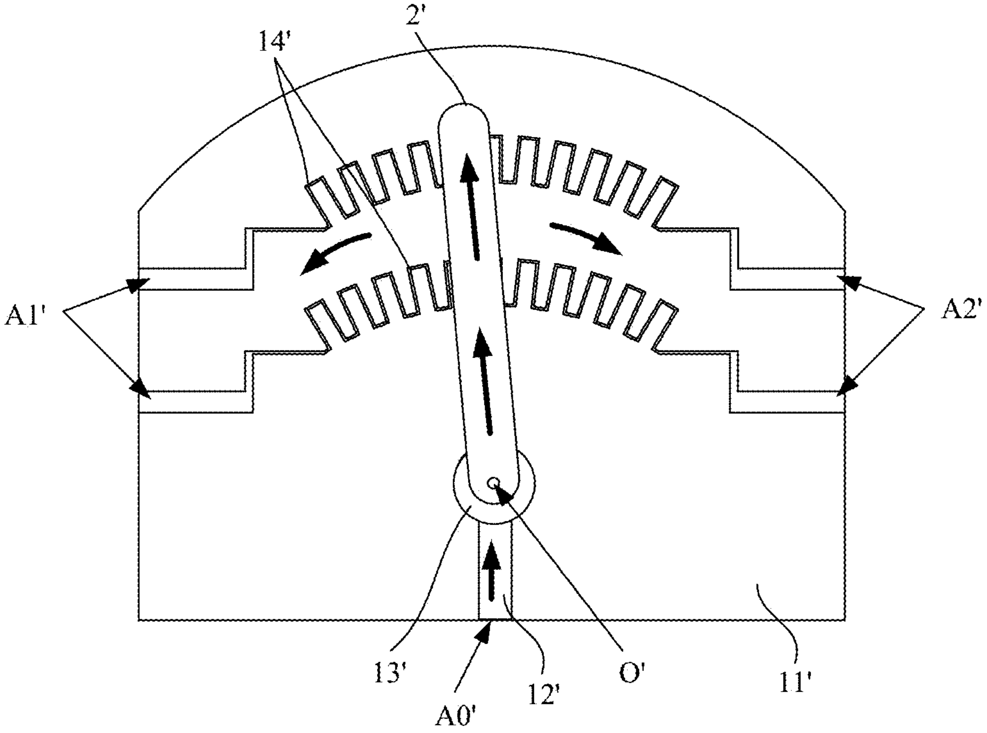
FIG. 4*a* is a diagram of a structure of a phase shifter in the conventional technology.

In an existing phase shifter structure shown in FIG. 4*a*, a main feeder 12', a central disc 13', and two strip lines 14' are disposed on a substrate 11'. Each strip line 14' has an arc-shaped segment, and the arc-shaped segment is distributed in a serpentine structure. The central disc 13' is electrically connected to the arc-shaped segment of the strip line 14' by using a coupling swing arm 2' that is hinged to a center O' of the central disc 13', so as to implement electrical signal transmission between the central disc 13' and the two strip lines 14'. An end that is of the main feeder 12' and that is away from the central disc 13' is a signal input end A0', and two ends of each strip line 14' are a first signal output end A1' and a second signal output end A2' respectively. The electrical signal may enter from the signal input end A0', is transferred to the two strip lines 14' through the main feeder 12', the central disc 13', and the coupling swing arm 2', and is divided into left and right channels at an electrical connection point between the coupling swing arm 2' and each strip line 14'. One channel of electrical signal passes through a part of the strip line 14' between the first signal output end A1' and the coupling swing arm 2' and is output from the first signal output end A1', and the other channel of electrical signal passes through a part of the strip line 14' between the second signal output end A2' and the coupling swing arm 2', and is output from the second signal output end A2'. Using one strip line 14' as an example, in an ideal state, a length of the strip line 14' between the coupling swing arm 2' and the first signal output end A1' and a length of the strip line 14' between the coupling swing arm 2' and the second signal output end A2' may be changed by rotating the coupling swing arm 2' according to a requirement. The main feeder 12' is located on a geometric central symmetry axis of the arc-shaped segment. After the coupling swing arm 2' rotates by any angle, a variation of the length of the strip line 14' between the coupling swing arm 2' and the first signal output end A1' is the same as a variation of the length of the strip line 14' between the coupling swing arm 2' and the second signal output end A2'. According to a relational expression $\varphi=2\pi/\lambda\cdot\Delta L$ between a phase and a line length, where $\varphi$ is the phase, $\lambda$ is an operating wavelength, and $\Delta L$ is a line length variation, compared with the electrical signal input by the signal input end A0', the electrical signal output by the first signal output end A1' of the strip line 14' generates a phase change of $+\varphi$, and the electrical signal output by the second signal output end A2' generates a phase change of $-\varphi$. For example, a phase of the electrical signal input from the signal input end A0' is $\varphi 0$. A phase of the electrical signal output by the first signal output end A1 is $\varphi 1$, where $\varphi 1=\varphi 0+\Delta\varphi$. A phase of the electrical signal output by the second signal output end A2' is $\varphi 2$, where $\varphi 2=\varphi 0-\Delta\varphi$. Compared with the electrical signal input from the signal input end A0, the phases of the electrical signals output by the first signal output end A1' and the second signal output end A2' change by A0. It may be considered that, with the electrical signal input from the signal input end A0' as a reference, the phases of the electrical signals output by the first signal output end A1' and the second signal output end A2' have a symmetrical phase difference. The phase of the electrical signal output by the first signal output end A1' and the phase of the electrical signal output by the second signal output end A2' have the same downtilt angle at the same frequency, thereby achieving an objective of adjusting an antenna directivity pattern.

Figure 4B:
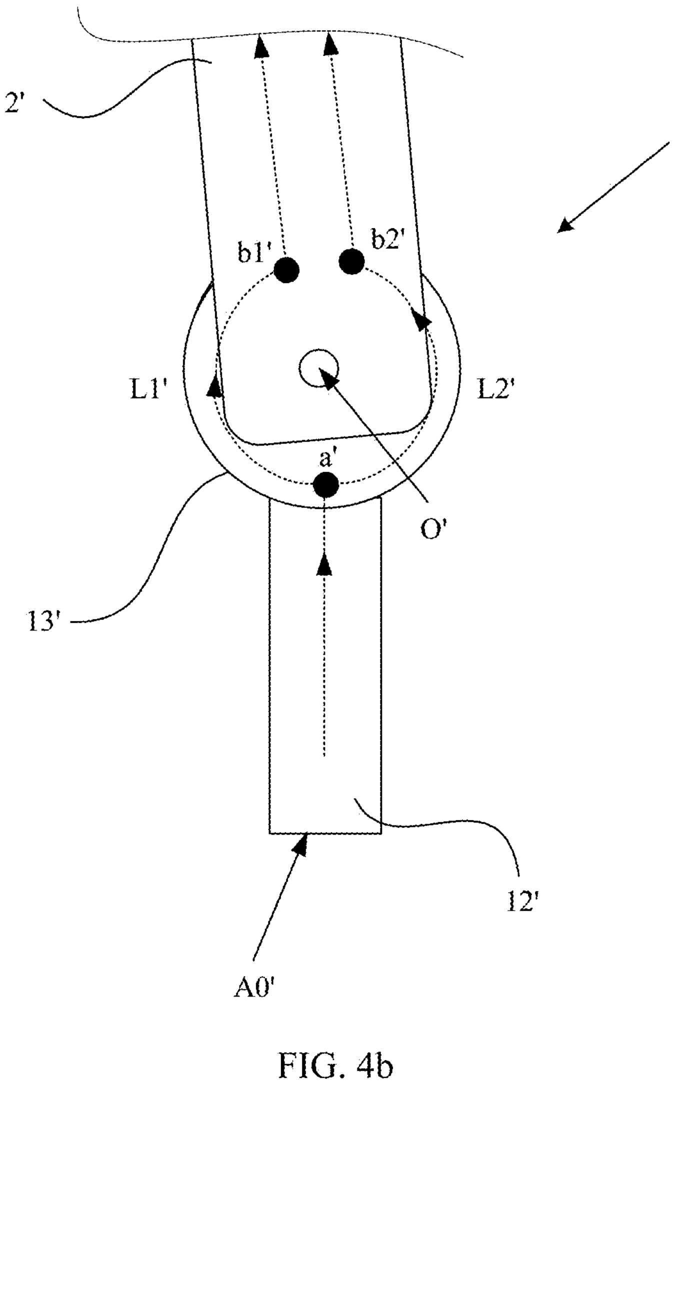
FIG. 4*b* is a diagram of a transmission path of an electrical signal of a phase shifter on a coupling surface in the conventional technology.

During actual working, continue to refer to an example of a path for transferring an electrical signal at the central disc 13' shown in FIG. 4*b*. After the electrical signal input from the signal input end A0' passes through the main feeder 12', the output electrical signal enters the central disc 13' from a point a', and is divided into two channels and transferred to the coupling swing arm 2'. One channel of electrical signal passes through the point a' and reaches a point b1', and a transmission path is L1'. The other channel of electrical signal passes through the point a' and reaches a point b2, and a transmission path is L2'. A length of the path L1' is equal to a length of the path L2' only when the coupling swing arm 2' and the main feeder 12' are kept on the same line. However, to change an output phase of an electrical signal to meet a feed-in phase requirement of the antenna array, the coupling swing arm 2' needs to rotate around the center O' as required, and there is an included angle between a length direction of the coupling swing arm 2' and a length direction of the main feeder 12'. As a result, the length of the path L1' is different from the length of the path L2'. According to the foregoing relational expression between a phase and a line length, two electrical signals obtained through division in a process in which an electrical signal passes through the central disc 13' may have different phase changes. As a result, a phase difference between the electrical signals output by the first signal output end A1' and the second signal output end A2' is asymmetric, and a feed-in phase of the antenna array does not meet a requirement. This affects electrical performance such as a side lobe and a directivity pattern of the base station antenna, thereby causing a signal coverage problem.

Figure 5A:
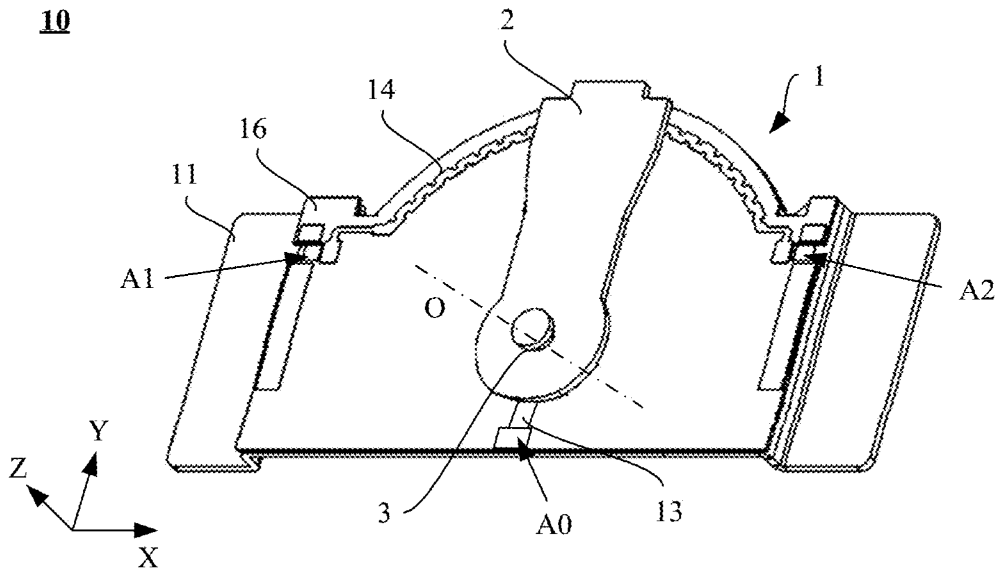
FIG. 5*a* is a diagram of a structure of a phase shifter according to an embodiment of this application.

As shown in FIG. 5*a*, an embodiment of this application provides a phase shifter 10. The phase shifter 10 may be used to change phase distribution of an antenna array, so as to adjust a radiation direction of an antenna. The phase shifter 10 specifically includes a phase shifter component 1 and a swing arm component 2, and the swing arm component 2 is rotatably mounted on the phase shifter component 1 by using a central shaft 3. The swing arm component 2 specifically rotates around a rotation center O, the rotation center O is perpendicular to the phase shifter component 1, and an axis of the central shaft 3 is collinear with the rotation center O. Further, refer to a diagram of a structure of the phase shifter component 1 shown in FIG. 5*b*. The phase shifter component 1 specifically includes a substrate 11 and a dielectric layer 16 disposed on the substrate 11. The dielectric layer 16 is disposed on the substrate 11, and a coupling surface 12, a main feeder 13, and a strip line 14 are disposed on a surface that is of the dielectric layer 16 and that is away from the substrate 11. The coupling surface 12 herein is a circular ring, and a center of the circular ring is coaxial with the rotation center O. The coupling surface 12 is electrically connected to the strip line 14 by using the swing arm component 2. The coupling surface 12, the main feeder 13, and the strip line 14 form a main circuit on the substrate 11. One end of the main feeder 13 is electrically connected to the coupling surface 12, and another end of the main feeder 13 is a signal input end A0. The signal input end A0 is configured to receive an electrical signal input to the phase shifter 10, and the electrical signal may be defined as a first electrical signal. Two signal output ends are provided at two ends of the strip line 14, and the two signal output ends are a first signal output end A1 and a second signal output end A2 respectively. Both the first signal output end A1 and the second signal output end A2 are configured to output an electrical signal, and the electrical signal may be defined as a second electrical signal.

The strip line 14 includes an arc-shaped segment 141, a first wiring segment 142, and a second wiring segment 143, the first wiring segment 142 is connected to a first end of the arc-shaped segment 141, and the second wiring segment 143 is connected to a second end of the arc-shaped segment 141. It should be understood that, in the phase shifter 10 shown in FIG. 5*a*, the coupling surface 12 is not shown due to blocking of the swing arm component 2.

Figure 5B:
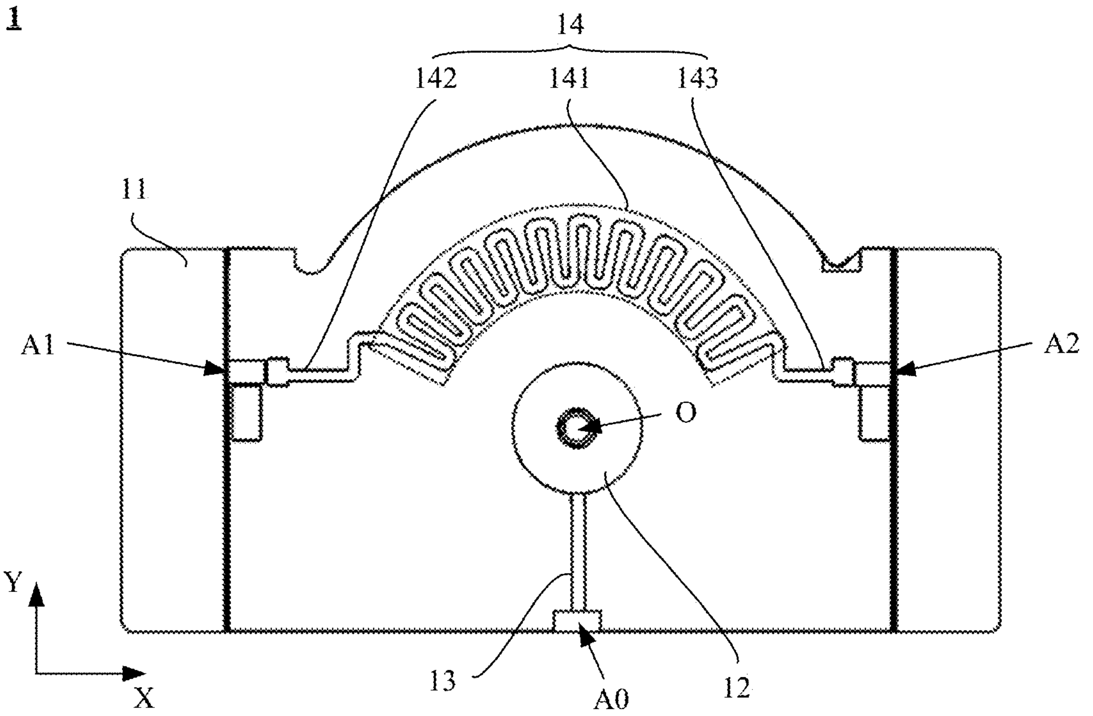
FIG. 5*b* is a diagram of a structure of a phase shifter component in a phase shifter according to an embodiment of this application.

As shown in FIG. 5*b*, the arc-shaped segment 141 is located in a dashed-line box, and the arc-shaped segment 141 is distributed in a serpentine structure. The strip line 14 is bent into a line of the serpentine structure, and a longer line may be arranged in a same routing region compared with a single line. When the swing arm component 2 rotates at a same angle, a phase variation of the strip line 14 having the serpentine structure is greater than a phase variation of a single line. Alternatively, when phase variations are the same, a dimension occupied by the strip line 14 having the serpentine structure in an extension direction of the arc-shaped segment 141 is smaller, that is, the strip line 14 is shorter. Therefore, the arc-shaped segment 141 of the strip line 14 has a smaller radius and a smaller size, so that distribution space of the strip line 14 can be saved, and a size of the phase shifter component 1 can be reduced. The arc-shaped segment 141 and the rotation center O are disposed with a same circle center, that is, a circle center of the arc-shaped segment 141 coincides with the rotation center O.

In the phase shifter 10 shown in FIG. 5*a* and FIG. 5*b*, a thickness direction of the substrate 11 is a first direction Z, and the rotation center of the swing arm component 2 is parallel to the first direction Z. The arc-shaped segment 141 of the strip line 14 is left-right symmetrical, a direction of a symmetry axis of the arc-shaped segment 141 is defined as a third direction Y, and a direction perpendicular to the symmetry axis of the arc-shaped segment 141 is defined as a second direction X. The first direction Z, the second direction X, and the third direction Y are perpendicular to each other, and a plane including the second direction X and the third direction Y is parallel to the substrate 11.

Figure 5C:
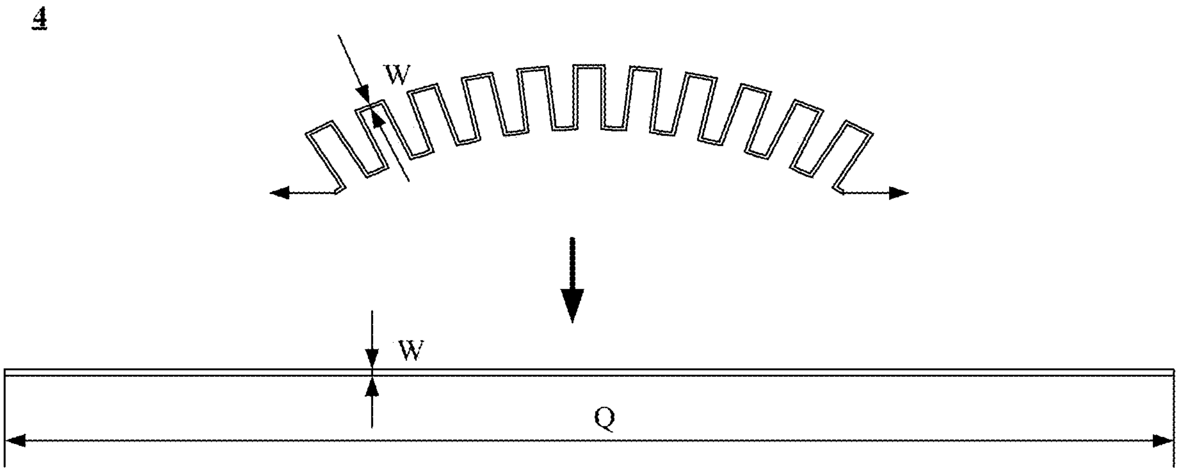
FIG. 5*c* is a diagram of a structure of a strip in a phase shifter according to an embodiment of this application.

The strip line 14 has a relatively large length-diameter ratio, and a length of the strip line 14 is far greater than a radial dimension. For ease of understanding, FIG. 5*c* shows structures of the strip line 14 in different forms. An upper figure in FIG. 5*c* is a strip line 14 of a serpentine structure. The strip line 14 of the serpentine structure is stretched straight along arrows at two ends, to obtain a straight-line strip line 14 shown in a lower figure in FIG. 5*c*. A length Q of the straight-line strip line 14 may be considered to be equal to a line length of the strip line 14 of the serpentine structure, and a line width W of the strip line 14 is a radial dimension of the strip line 14 perpendicular to an extension direction. Using the substrate 11 as a reference, the line width W herein may be considered as a radial dimension of the strip line 14 parallel to the substrate 11.

Figure 6A:
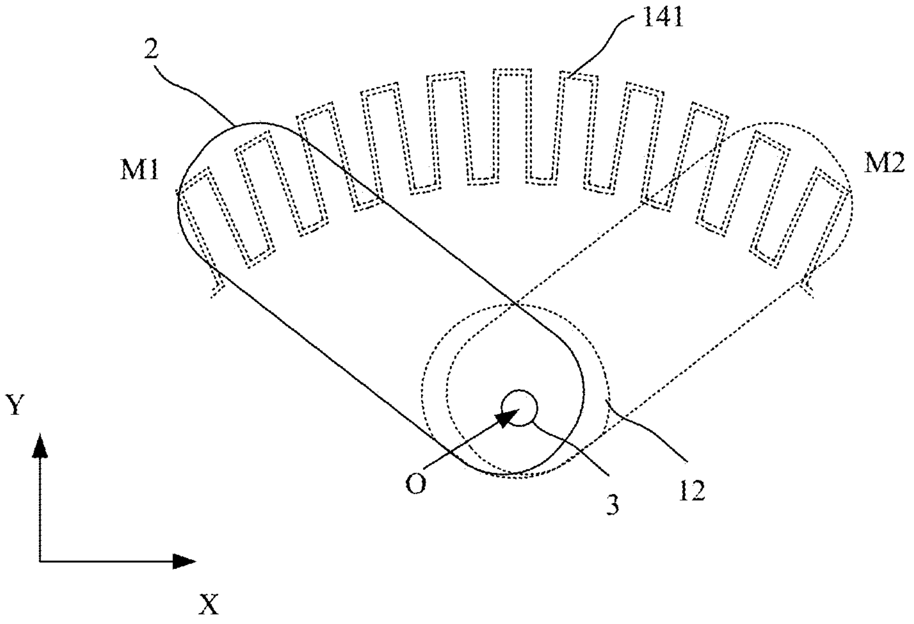
FIG. 6*a* is a diagram of a structure of a partial structure of a phase shifter according to an embodiment of this application.
Figure 6B:
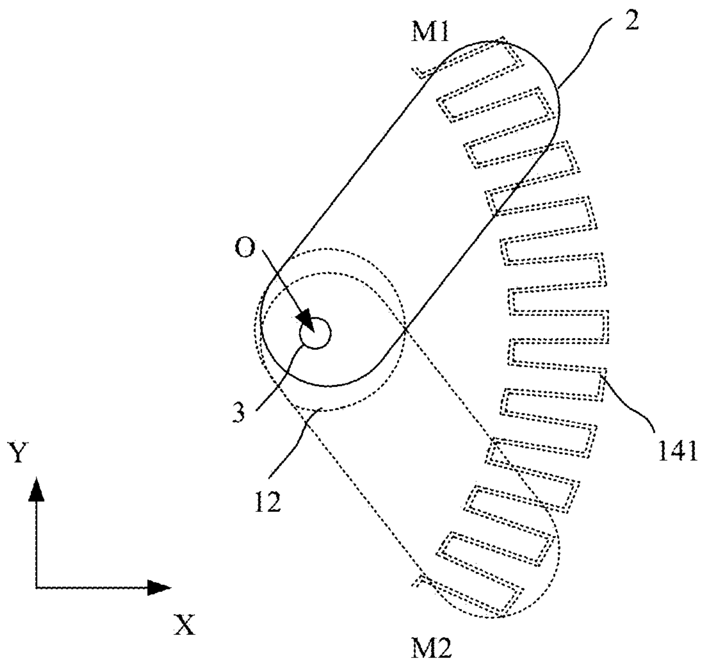
FIG. 6*b* is a diagram of a structure of a partial structure of a phase shifter according to an embodiment of this application.

It should be understood that the coupling surface 12 is a connection structure used to connect the swing arm component 2 and the main feeder 13, and provides a conductor for transmitting an electrical signal between the swing arm component 2 and the main feeder 13. For example, the coupling surface 12 is represented by a layered structure, and the layered structure has a relatively large planar area and a relatively thin thickness. In a process in which the swing arm component 2 rotates relative to the coupling surface 12, a part that is of the coupling surface 12 and that is in contact with the swing arm component 2 may be considered as a conductor surface used to transmit an electrical signal. However, a structure of the coupling surface 12 is not limited to the layered structure, and another structure may be used as long as an electrical connection between the swing arm component 2 and the main feeder 13 can be implemented. In some implementations, the coupling surface 12 may be the central disc in the foregoing embodiment. In addition, a shape of the coupling surface 12 is merely an example for structural description herein. Generally, electrical connections between the swing arm component 2 and the coupling surface 12 and the strip line 14 are in a capacitive coupling manner. In some possible implementations, electrical connections between the swing arm component 2 and the coupling surface 12 and the strip line 14 may alternatively be other electrical connection manners. During actual application, the swing arm component 2 swings around the rotation center O in a plane parallel to the substrate 11. In a process in which the swing arm component 2 rotates relative to the coupling surface 12, to ensure a good electrical connection between the swing arm component 2 and the coupling surface 12, when the swing arm component 2 swings at any angle, a relative contact area between the swing arm component 2 and the coupling surface 12 needs to be consistent. Therefore, the coupling surface 12 may be disposed as a circular ring. With reference to the structure of the phase shifter 10 shown in FIG. 5*a*, a swing range of the swing arm component 2 is related to an angle range of the arc-shaped segment 141 of the strip line 14. Therefore, the coupling surface 12 may also be correspondingly set to an irregular shape shown in FIG. 6*a*. A position M1 is a limit position at which the swing arm component 2 swings to one end of the arc-shaped segment 141, and a position M2 is a limit position at which the swing arm component 2 swings to the other end of the arc-shaped segment 141. A placement orientation of the arc-shaped segment 141 of the strip line 14 is not limited. When the arc-shaped segment 141 is symmetrically placed left and right as shown in FIG. 6*a*, the swing arm component 2 swings left and right relative to the arc-shaped segment 141. When the arc-shaped segment 141 is symmetrically placed up and down as shown in FIG. 6*b*, the swing arm component 2 swings up and down relative to the arc-shaped segment 141. When the arc-shaped segment 141 is placed at another angle, a swing direction of the swing arm component 2 relative to the arc-shaped segment 141 is also limited by directions of two ends of the arc-shaped segment 141. An example is not described herein again.

When the swing arm component 2 swings back and forth between the position M1 and the position M2, a relative contact area between the swing arm component 2 and the coupling surface 12 is kept consistent. Certainly, the coupling surface 12 shown in FIG. 6*a* and FIG. 6*b* is merely an example. During specific application of the phase shifter 10, coupling surfaces 12 of different shapes may be disposed according to a requirement and a related technical parameter.

Figure 7:
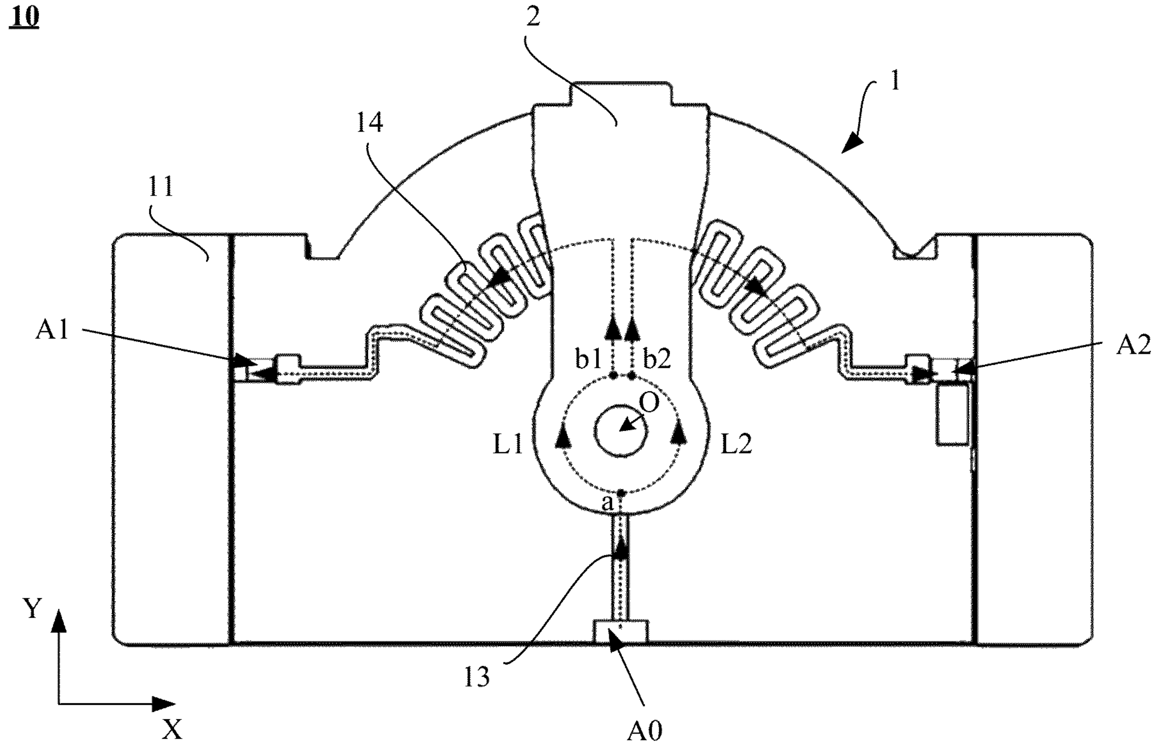
FIG. 7 is a diagram of a working principle of a phase shifter according to an embodiment of this application.

During working, as shown in FIG. 7, the first electrical signal enters the phase shifter component 1 from the signal input end A0, reaches the coupling surface 12 through the main feeder 13, and then is transferred to the strip line 14 through the swing arm component 2. For example, after passing through the main feeder 13, the electrical signal enters the coupling surface 12 from a point a, and then passes through the coupling surface 12 in two channels to reach the swing arm component 2. After passing through the path L1 from the point a, one channel of electrical signal reaches the swing arm component 2 through a point b1, and after passing through the path L2 from the point a, the other channel of electrical signal reaches the swing arm component 2 through a point b2. In FIG. 7, when the length direction of the swing arm component 2 and the length direction of the main feeder 13 are basically kept on a line extending along the third direction Y, the path L1 and the path L2 that the electrical signal passes through on the coupling surface 12 are basically the same. When the swing arm component 2 rotates around the rotation center O by a specific angle, an included angle is formed between the swing arm component 2 and the main feeder 13, and the path L1 and the path L2 that the electrical signal passes through on the coupling surface 12 are no longer equal. As a result, there is a difference between a phase change of an electrical signal passing through the path L1 and a phase change of an electrical signal passing through the path L2. Assuming that the phase of the first electrical signal input from the signal input end A0 is $\varphi 0$, the phase of the electrical signal passing through the path L1 is $\varphi 0+\Delta\varphi 1$, and the phase of the electrical signal passing through the path L1 changes to $\varphi 0-\Delta\varphi 2$, where $\Delta\varphi 1+\Delta\varphi 2$.

To ensure that the phase change of the second electrical signal output by the first signal output end A1 and the phase change of the second electrical signal output by the second signal output end A2 have an equal magnitude and are in opposite directions, a final phase of the second electrical signal output by the first signal output end A1 should be $\varphi 0+\Delta\varphi$, and a final phase of the second electrical signal output by the second signal output end A2 should be $\varphi 0-\Delta\varphi$, that is, has a symmetrical phase difference with the second electrical signal output by the first signal output end A1. In the phase shifter 10 provided in embodiments of this application, a structure of the strip line 14 is improved. Specifically, a phase of an electrical signal passing through the arc-shaped segment 141 between the swing arm component 2 and the first signal output end A1 changes to $\Delta\varphi-\Delta\varphi 1$, and a phase of an electrical signal passing through the arc-shaped segment 141 between the swing arm component 2 and the second signal output end A2 changes to $\Delta\varphi 2-\Delta\varphi$. That is, after the first electrical signal enters the main feeder 13, and passes through the path L1 on the coupling surface 12 and the arc-shaped segment 141 between the swing arm component 2 and the first signal output end A1, a phase of the second electrical signal output from the first signal output end A1 is $\varphi 1$, where $\varphi 1=\varphi 0+\Delta\varphi$. After the first electrical signal enters the main feeder 13, and passes through the path L2 on the coupling surface 12 and the arc-shaped segment 141 between the swing arm component 2 and the second signal output end A2, a phase of the second electrical signal output from the second signal output end A2 is $\varphi 2$, where $\varphi 2=\varphi 0-\Delta\varphi$. With the first electrical signal input from the signal input end A0 as a reference, the phases of the second electrical signals output by the first signal output end A1 and the second signal output end A2 have a symmetrical phase difference. A strip line 14 shown in FIG. 8*a* includes an arc-shaped segment 141, a first wiring segment 142, and a second wiring segment 143. The arc-shaped segment 141 is distributed in a serpentine structure. In an example in which the first wiring segment 142 points to the second wiring segment 143 along the arc extension direction of the arc-shaped segment 141, a line width of the serpentine structure remains unchanged, a bending depth H of the serpentine structure remains consistent, and a spacing of the serpentine structure of the arc-shaped segment 141 gradually increases. The increase of the spacing herein may be considered as a gradual increase of a gap between any two adjacent serpentine structures, or may be considered as a gradual increase of a line length of the arc-shaped segment 141 within a same center angle. From a perspective of a size of a region occupied by the arc-shaped segment 141 in a unit area, it may also be considered that density of the arc-shaped segment 141 gradually increases in the unit area. For example, a first line segment S1 in a center angle $\theta$ is used as an example in a region close to the first wiring segment 142, and a second line segment S2 in a center angle $\theta$ is used as an example in a region close to the second wiring segment 142. Density of a serpentine structure in the first line segment S1 is greater than a density of a serpentine structure in the second line segment S2. When the bending depth H of the serpentine structure remains consistent, a higher density of the serpentine structure indicates a larger path length of the line segment, that is, a path length of the first line segment S1 is greater than a path length of the second line segment S2. Certainly, in the arc extension direction of the arc-shaped segment 141, for example, in a direction in which the second wiring segment 143 points to the first wiring segment 142, density of the serpentine structure of the arc-shaped segment 141 in the center angle $\theta$ gradually decreases.

Figure 8A:
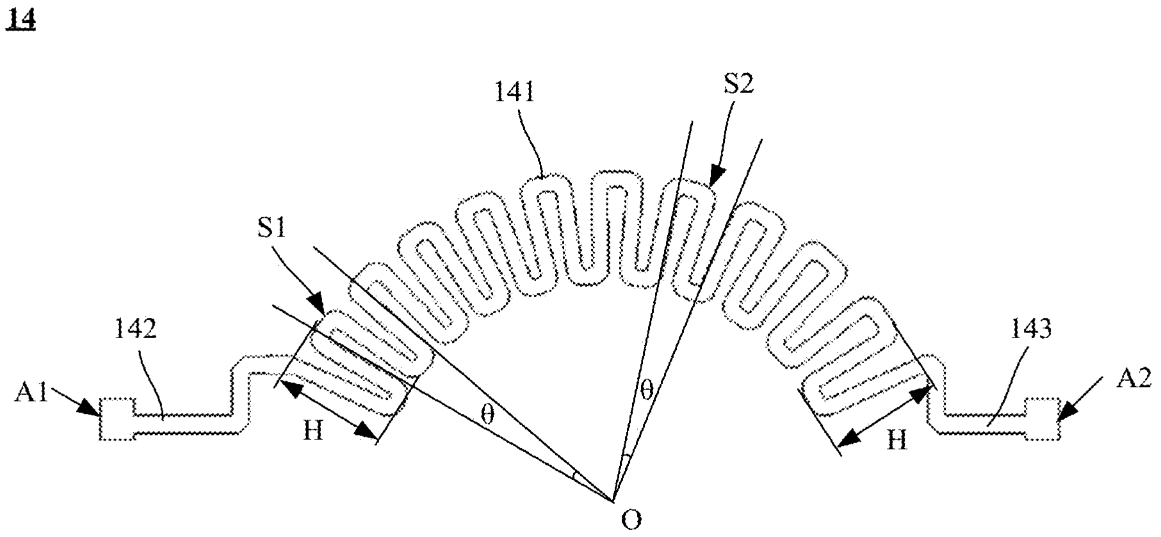
FIG. 8*a* is a diagram of a structure of a strip in a phase shifter according to an embodiment of this application.
Figure 8B:
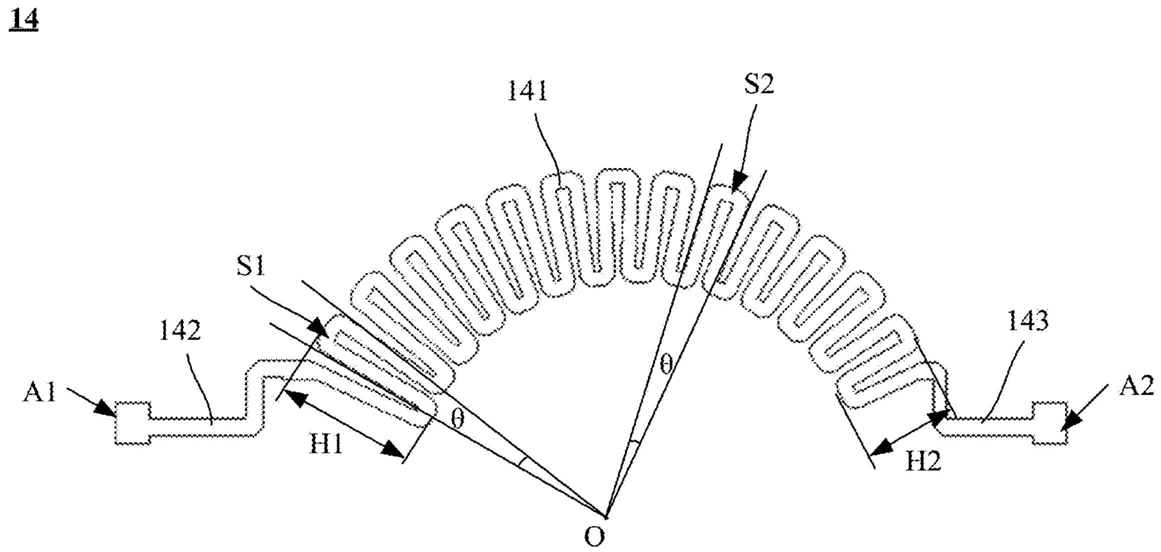
FIG. 8*b* is a diagram of a structure of a strip in a phase shifter according to an embodiment of this application.

In another strip line 14 shown in FIG. 8*b*, the arc-shaped segment 141 is distributed in a serpentine structure. Density of the serpentine structure of the arc-shaped segment 141 in the center angle $\theta$ is the same. In an example in which the first wiring segment 142 points to the second wiring segment 143 along the arc extension direction of the arc-shaped segment 141, the bending depth H of the serpentine structure gradually decreases. A first line segment S1 in a center angle $\theta$ is used as an example in a region close to the first wiring segment 142. A bending depth of the serpentine structure in the first line segment S1 is a first depth H1. A second line segment S2 in a center angle $\theta$ is used as an example in a region close to the second wiring segment 143. A bending depth of the serpentine structure in the second line segment S2 is a second depth H2. The first depth H1 is greater than the second depth H2. When the density of the serpentine structure of the arc-shaped segment 141 in the center angle $\theta$ is the same, a larger bending depth H of the serpentine structure indicates a larger path length of the line segment, that is, a path length of the first line segment S1 is greater than a path length of the second line segment S2. Certainly, along the arc extension direction of the arc-shaped segment 141, for example, in a direction in which the second wiring segment 143 points to the first wiring segment 142, the bending depth H of the serpentine structure gradually increases.

The strip line 14 shown in FIG. 8*a* and FIG. 8*b* is used as an example. A line width of the arc-shaped segment 141 is consistent, and along the arc extension direction of the arc-shaped segment 141, a path length of the arc-shaped segment 141 in a unit center angle gradually increases or decreases. When the swing arm component 2 swings at a same angle relative to the arc-shaped segment 141 of the strip line 14, line lengths of arc-shaped segments 141 on two sides of the swing arm component 2 change differently, and different phase changes are generated when two electrical signals pass through the arc-shaped segments 141 on the two sides of the swing arm component 2. The serpentine structure is adjusted, so that a difference between phase changes of the two electrical signals that pass through the arc-shaped segments 141 on the two sides of the swing arm component 2 can compensate for a difference between phase changes of the two electrical signals on the coupling surface 12 shown in FIG. 3, and therefore phase changes of the second electrical signals output by the two signal output ends of the strip line 14 can be adjusted to be consistent. That is, the difference between the phase changes of the two electrical signals on the coupling surface 12 shown in FIG. 3 may be compensated by adjusting distribution of the serpentine structure of the arc-shaped segment 141, so that after the two electrical signals pass through the main feeder 13, the coupling surface 12, the swing arm component 2, and the strip line 14, the phase change of the second electrical signal output by the first signal output end A1 is the same as the phase change $\Delta\varphi$ of the second electrical signal output by the second signal output end A2, so that a phase change requirement of the electrical signal is met.

Figure 9:
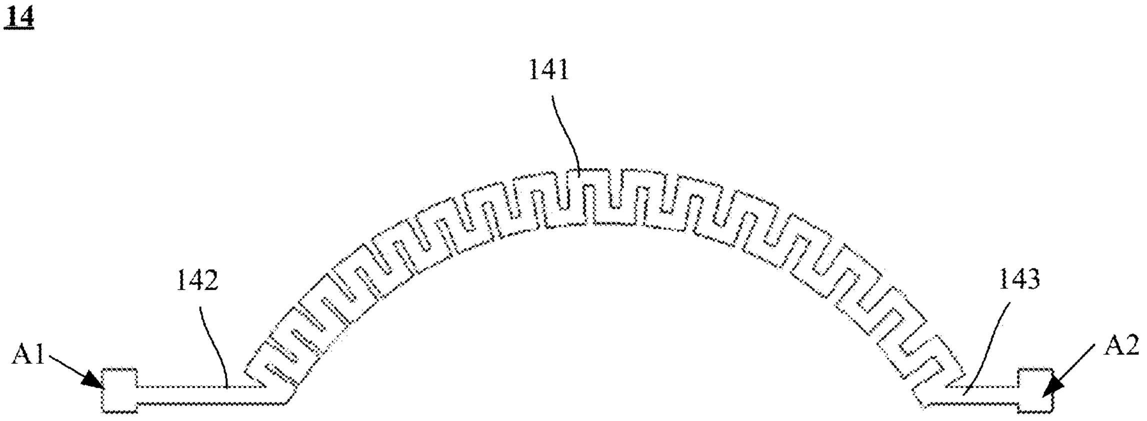
FIG. 9 is a diagram of a structure of a strip in a phase shifter according to an embodiment of this application.

A bend quantity and distribution density of the serpentine structure are not limited, and need to be determined based on a quantity of antenna elements in an application scenario. A distribution angle of the arc-shaped segment 141 of the strip line 14 may be determined based on a swing angle of the swing arm component 2. Certainly, a shape of the serpentine structure is not limited. In FIG. 8*a* and FIG. 8*b*, a bending angle of a bending part of the serpentine structure is a rounded-angle arch, and FIG. 9 shows that a bending angle of a bending part of the serpentine structure is a bending angle. Certainly, the bending part of the serpentine structure may alternatively be in a shape of a triangle, M, W, 2, S, or the like, provided that the foregoing change rule can be met.

When the phase shifter 10 is used in the base station antenna 100, the electrical signal is a radio frequency signal. As an electromagnetic wave, the radio frequency signal includes an antenna signal.

Figure 10:
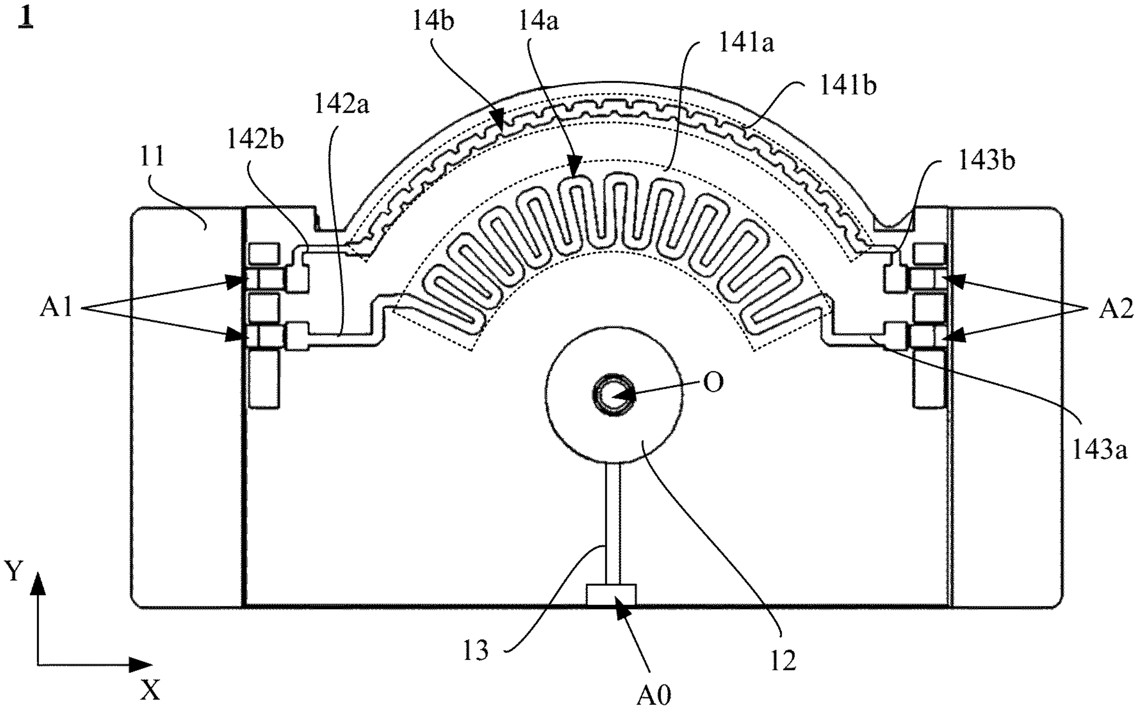
FIG. 10 is a diagram of a structure of a phase shifter component in a phase shifter according to an embodiment of this application.

In some embodiments, there may be a plurality of strip lines 14. As shown in FIG. 10, there are two strip lines 14 on the phase shifter component 1. In the third direction Y perpendicular to the second direction X, the two strip lines 14 are located on one side along the third direction Y. Arc-shaped segments 141 of the two strip lines 14 are sequentially arranged from inside to outside along a radial direction of the rotation center O, and the arc-shaped segments 141 of the strip lines 14 have different radii. Specific shapes of the two strip lines 14 are different, a radius of an arc-shaped segment 141*a* of a strip line 14*a* close to the coupling surface 12 is small, and a radius of an arc-shaped segment 141*b* of a strip line 14*b* away from the coupling surface 12 is large. A path length of the arc-shaped segment 141*a* is greater than a path length of the arc-shaped segment 141*b*. To dispose the arc-shaped segment 141*a* with a larger path length on a side that is of the arc-shaped segment 141*b* with a smaller path length and that is close to the rotation center O, a bending depth of a serpentine structure of the arc-shaped segment 141*a* may be set to be greater than a bending depth of a serpentine structure of the arc-shaped segment 141*b*, and distribution density of the serpentine structure of the arc-shaped band 141*a* may be further increased. The longer strip line 14*a* is bent by using the serpentine structure of the arc-shaped segment 141*a* and arranged on a side that is of the substrate 11 and that is close to the rotation center O, so that space occupied by the strip line 14*a* is reduced, and a size of the phase shifter 10 may also be reduced.

Figure 11:
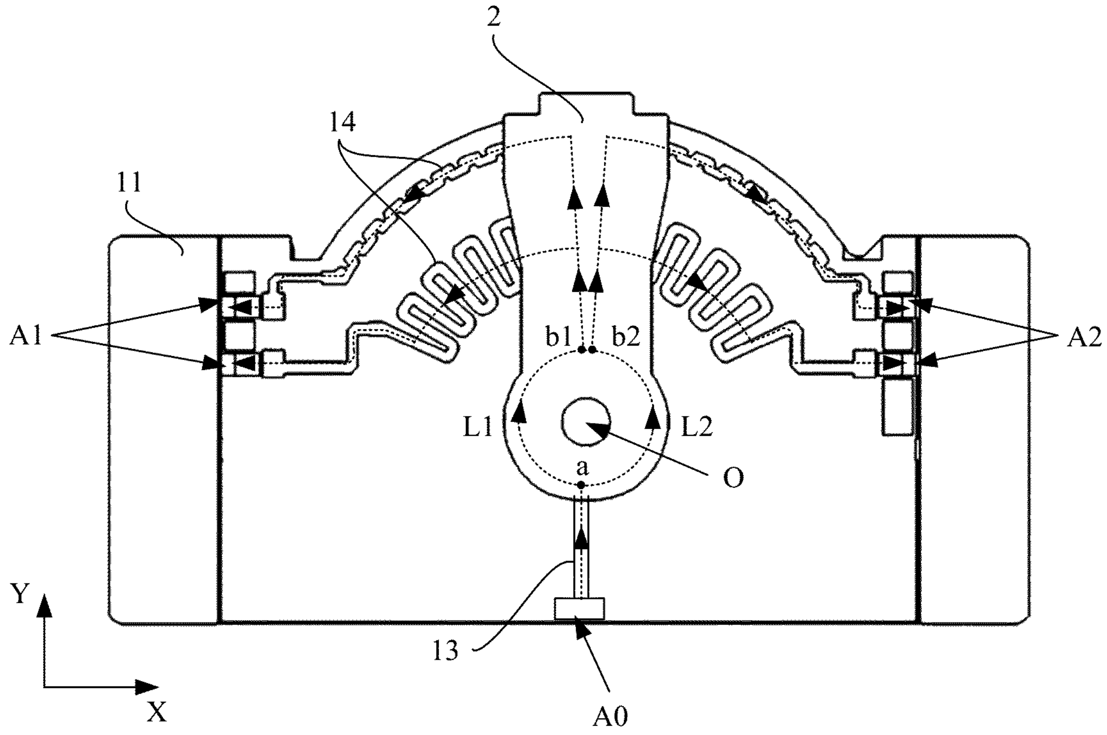
FIG. 11 is a diagram of a working principle of a phase shifter according to an embodiment of this application.

For a structure of the phase shifter 10 having the phase shifter component 1 shown in FIG. 10, refer to FIG. 11. The swing arm component 2 is rotatably mounted on the substrate 11, and the swing arm component 2 may rotate relative to the substrate 11. The rotation center O of the swing arm component 2 is coaxial with the center of the coupling surface 12. One end of the swing arm component 2 is electrically connected to the coupling surface 12, and another end of the swing arm component 2 is electrically connected to the arc-shaped segment 141 of each strip line 14. During working, the first electrical signal enters the phase shifter component 1 through the signal input end A0, reaches the coupling surface 12 through the main feeder 13, and is transferred to each strip line 14 through the swing arm component 2, and second electrical signals are output through the first signal output end A1 and the second signal output end A2 of each strip line 14. When the swing arm component 2 rotates around the rotation center O relative to the phase shifter component 1 to a position that is not on the same line as the main feeder 13, the path L1 and the path L2 that the electrical signal passes through on the coupling surface 12 are no longer equal. Dense distribution of the arc-shaped segment 141 of the strip line 14 is adjusted. When the swing arm component 2 swings at a same angle relative to the arc-shaped segment 141, a change of a path between the swing arm component 2 and the first signal output end A1 is different from that of a path between the swing arm component 2 and the second signal output end A2, and therefore, a phase change of an electrical signal passing through the path between the swing arm component 2 and the first signal output end A1 is different from a phase change of an electrical signal passing through the path between the swing arm component 2 and the second signal output end A2, so that a phase change difference can compensate for a difference between the phase change of the path L1 that the electrical signal passes through and the phase change of the path L2 that the electrical signal passes through. Finally, compared with the first electrical signal, the second electrical signal output by the first signal input end A1 has a phase change of $+\varphi$, and the second electrical signal output by the second signal output end A2 has a phase change of $-\varphi$, that is, has a symmetrical phase difference with the second electrical signal output by the first signal output end A1.

In the following embodiments, the phase shifter 10 provided in embodiments of this application is described by using two strip lines 14 as an example.

Figure 12A:
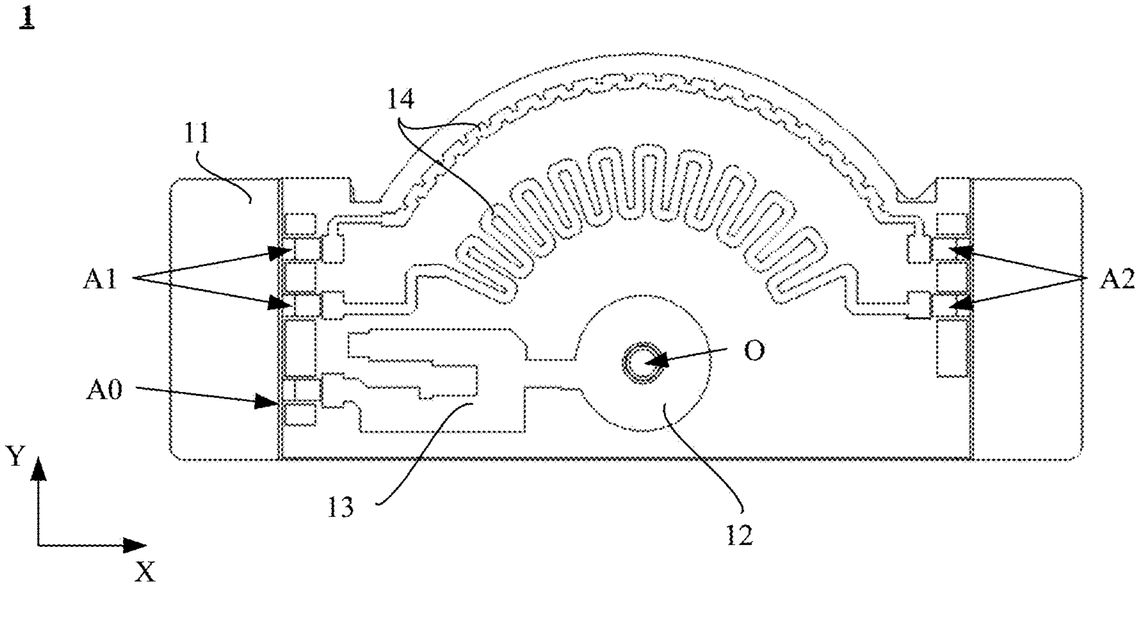
FIG. 12*a* is a diagram of a structure of a phase shifter component in a phase shifter according to an embodiment of this application.

In the phase shifter component 1 shown in FIG. 11, the main feeder 13 is located on a geometric central symmetry axis of the arc-shaped segment 141 of the strip line 14, and therefore the phase shifter 10 has a relatively large size. To adapt to a current development requirement of component miniaturization, based on the structure of the phase shifter component 1 shown in FIG. 7, as shown in FIG. 12*a*, an embodiment of this application provides a phase shifter component 1 in a phase shifter 10. For example, the main feeder 13 is not on a symmetry axis of the arc-shaped segment 141 along the second direction, and the signal input end A0 and the first signal output end A1 may be located on a same side. Certainly, the signal input end A0 and the second signal output end A2 may be located on a same side. In such a layout manner, space on two sides of the coupling surface 12 in the second direction is used, so that a dimension of the phase shifter component 1 in the third direction Y can be reduced, thereby facilitating miniaturization of the component. In the phase shifter component 1 shown in FIG. 8*a*, the main circuit has one signal input end A0 and four signal output ends, and the four output ends include two first signal output ends A1 and two second signal output ends A2. The signal input end A0 and the first signal output end A1 are located on a same side, or the signal input end A0 and the second signal output end A2 are located on a same side.

Figure 12B:
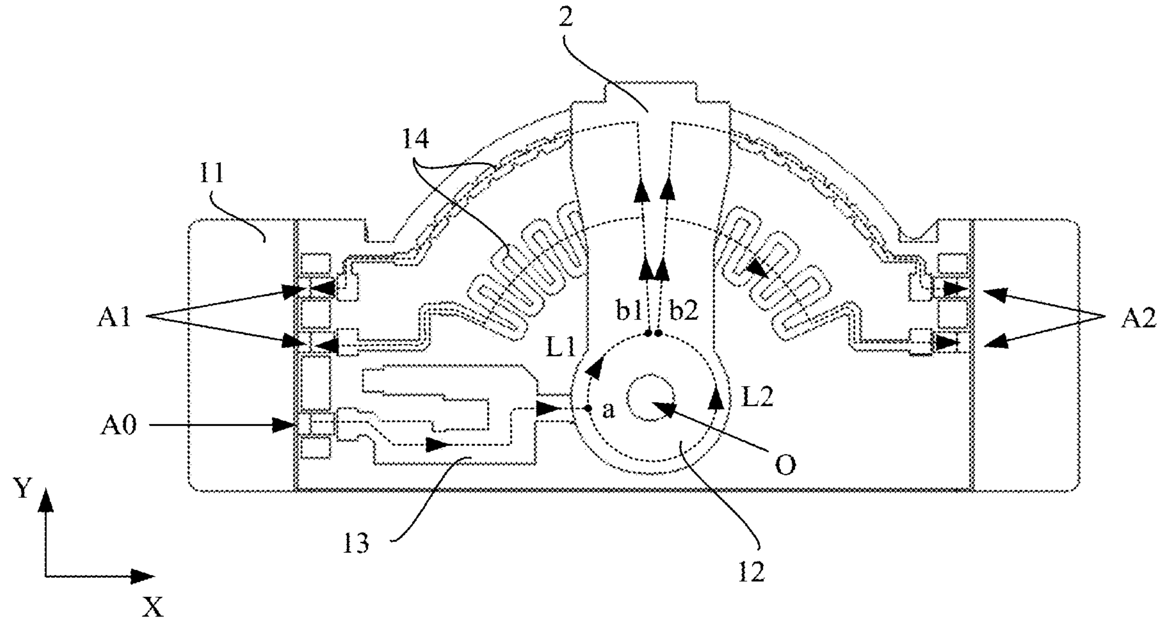
FIG. 12*b* is a diagram of a working principle of a phase shifter according to an embodiment of this application.

FIG. 12*b* shows a transfer path of an electrical signal in the phase shifter 10. After being input from the signal input end A0, a first electrical signal passes through the main feeder 13, the coupling surface 12, and the swing arm component 2 and reaches two strip lines 14, and second electrical signals are output from a first signal output end A1 and a second signal output end A2 of each strip line 14. It can be seen from FIG. 8*b* that, two paths of the electrical signal at the coupling surface 12 are respectively a path L1 between a point a and a point b1 and a path L2 between the point a and a point b2, and the path L1 is shorter than the path L2. Compared with the phase shifter 10 shown in FIG. 3, the first electrical signal at the coupling surface 12 may have a larger phase change difference due to a length difference between the paths. In this case, a shape of the strip line 14 needs to be adaptively adjusted, to ensure that the second electrical signal output by the first signal output end A1 and the second electrical signal output by the second signal output end A2 have phase changes with a same magnitude relative to the first electrical signal.

Figure 13A:
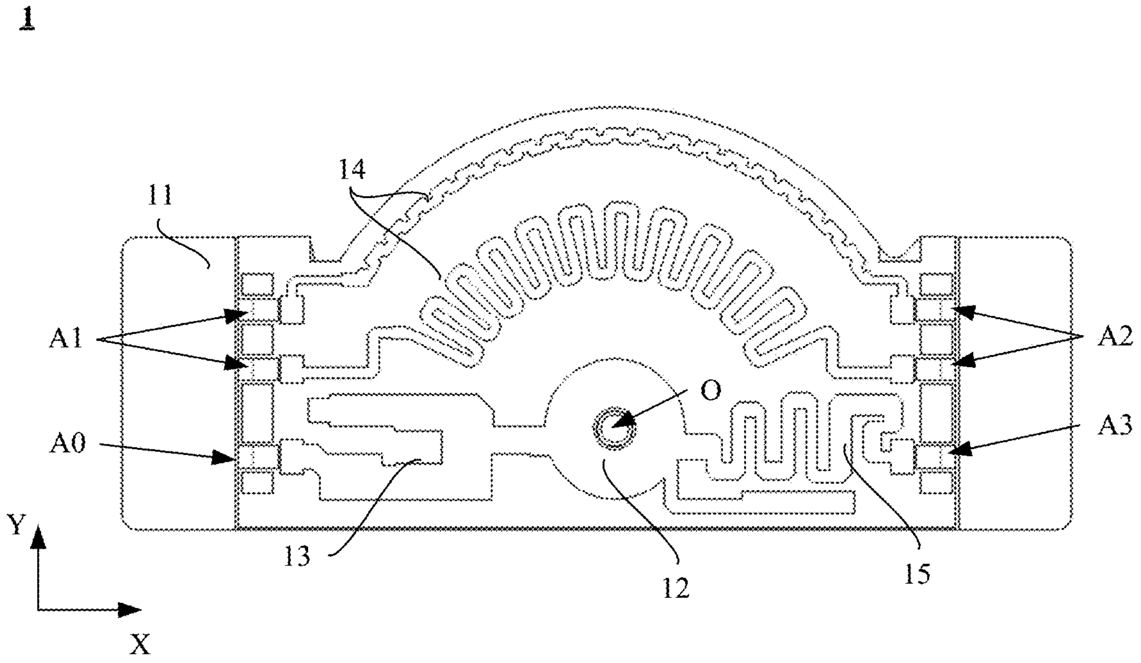
FIG. 13*a* is a diagram of a structure of a phase shifter component in a phase shifter according to an embodiment of this application.

In some embodiments, as shown in FIG. 13*a*, a center phase output line 15 connected to the coupling surface 12 is further disposed on the substrate 11. One end of the center phase output line 15 is connected to the coupling surface 12, and the other end of the center phase output line 15 is a center phase output end A3. The center phase output end A3 is also configured to output an electrical signal, and the electrical signal may be defined as a third electrical signal. In the phase shifter component 1 shown in FIG. 13*a*, the main circuit has one signal input end A0 and five output ends, and the five output ends include two first signal output ends A1, two second signal output ends A2, and one center phase output end A3. The signal input end A0 may be approximately opposite to the center phase output end A3 in the second direction X. The signal input end A0 and the first signal output end A1 are located on a same side, and the center phase output end A3 and the second signal output end A2 are located on a same side. Alternatively, the signal input end A0 and the second signal output end A2 are located on a same side, and the center phase output end A3 and the first signal output end A1 are located on a same side.

Figure 13B:
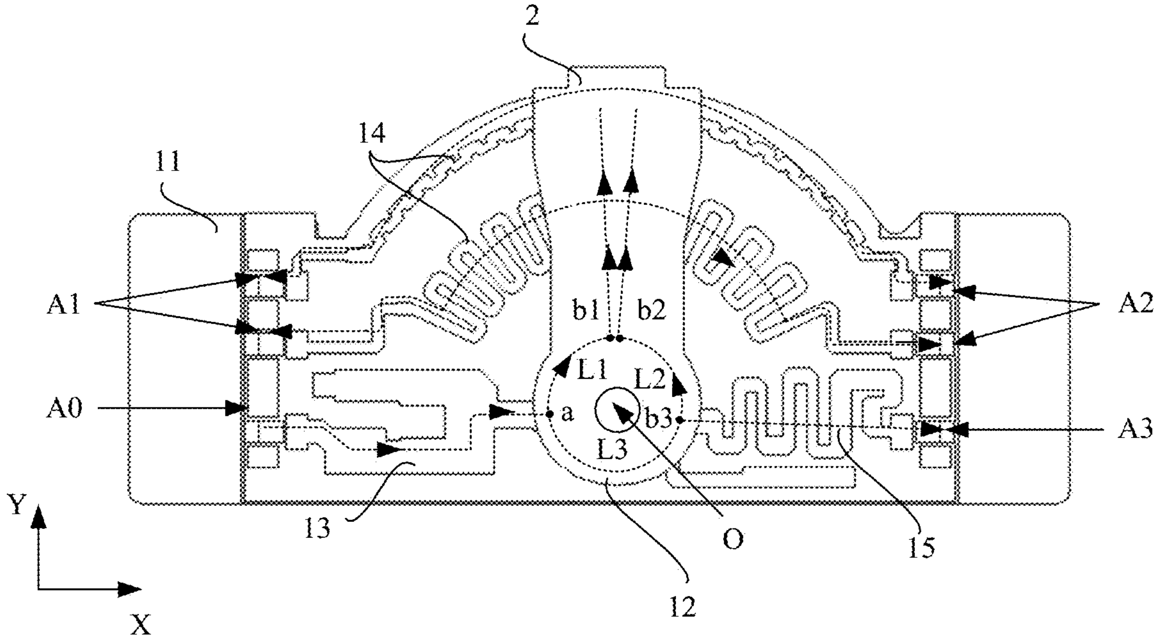
FIG. 13*b* is a diagram of a working principle of a phase shifter according to an embodiment of this application.

FIG. 13*b* shows a transfer path of an electrical signal in the phase shifter 10. After being input from the signal input end A0, a first electrical signal passes through the main feeder 13, the coupling surface 12, and the swing arm component 2 and reaches two strip lines 14, second electrical signals are output from a first signal output end A1 and a second signal output end A2 of each strip line 14, and a third electrical signal is output from the center phase output end A3. It can be seen from FIG. 13*b* that, two paths for the first electrical signal to reach the swing arm component 2 through the coupling surface 12 are respectively a path L1 between a point a and a point b1 and a path L2 between the point a and a point b2, and the path L1 is shorter than the path L2. Compared with the first electrical signal, the second electrical signals output from the first signal output end A1 and the second signal output end A2 have phase changes, and the second electrical signal output from the first signal output end A1 and the second electrical signal output from the second signal output end A2 have phase changes with a same magnitude relative to the first electrical signal. A path for the first electrical signal to reach the center phase output line 15 through the coupling surface 12 is a path L3 between the point a and a point b3. The center phase output end A3 outputs the third electrical signal. In a process in which the first electrical signal passes through the main feeder 13, the coupling surface 12, and the center phase output line 5 to output the third electrical signal, all electrical signals travel along the same path length. Therefore, phase changes of all the electrical signals are the same.

When the signal input end A0 is disposed on a side of the first signal output end A1, the center phase output end A3 may be disposed on a side of the second signal output end A2. When the signal input end A0 is disposed on a side of the second signal output end A2, the center phase output end A3 may be disposed on a side of the first signal output end A1. This can also reduce a dimension of the substrate 11 along the third direction.

It should be understood that, for ease of description, the electrical signal input from the signal input end A0 is defined as a first electrical signal, the electrical signals output by the two signal output ends are defined as second electrical signals, the electrical signal output by the center phase output end A3 is defined as a third electrical signal, and electrical signals at other positions are not specially defined.

Optionally, a lightning protection circuit may be disposed on the coupling surface 12 or the center phase output line 15, or lightning protection circuits may be disposed on both the coupling surface 12 and the center phase output line 15, to avoid a strike from a pulse current such as thunder or the like. In addition, in some possible applications, a filter circuit may be further disposed on the main feeder 13, to perform filtering processing on the input first electrical signal, so as to suppress power energy on another non-operating band.

Figure 14A:
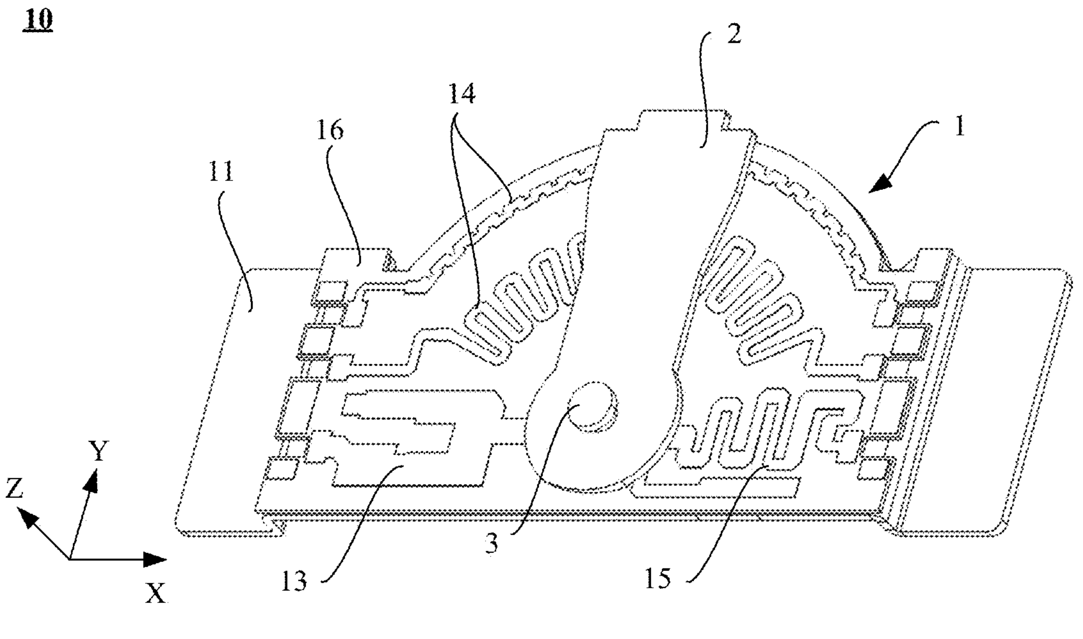
FIG. 14*a* is a diagram of a structure of a phase shifter according to an embodiment of this application.
Figure 14B:
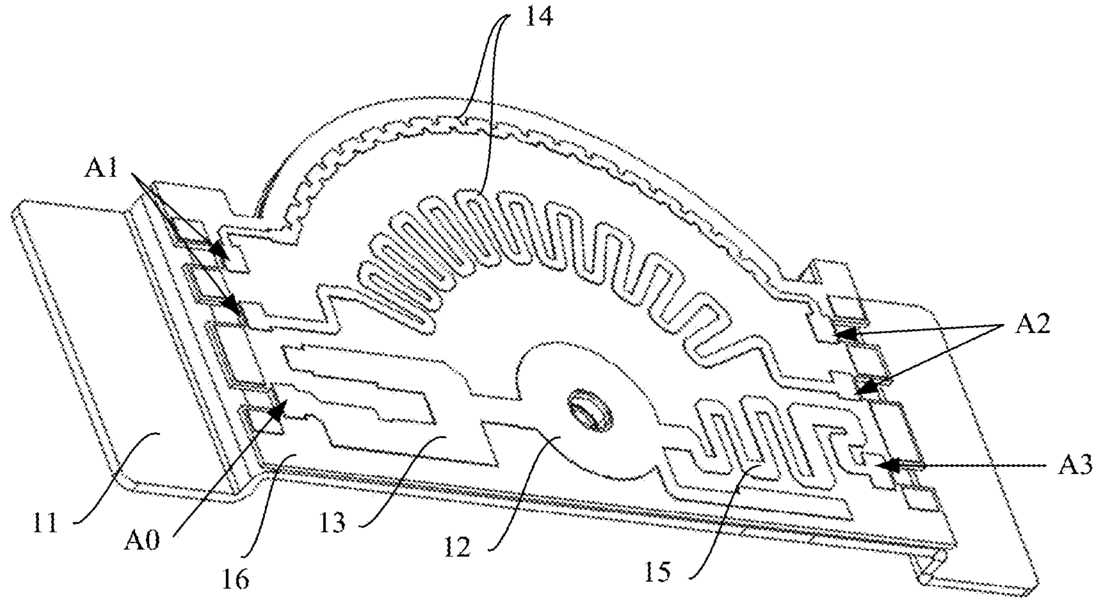
FIG. 14*b* is a diagram of a structure of a phase shifter component in a phase shifter according to an embodiment of this application.

In some other embodiments, in the phase shifter component 1 shown in FIG. 14*a* and FIG. 14*b*, when an electrical signal is transmitted on the strip line 14, the electrical signal is affected by the dielectric constant of the dielectric layer 16. Therefore, dielectric constants of materials at different positions of the dielectric layer 16 may be set differently, so that a phase change difference of the electrical signal at the coupling surface 12 can be compensated in a process of propagation of the electrical signal on the strip line 14. Finally, a phase change of a second electrical signal output by a first signal output end A1 and a phase change of a second electrical signal output by a second signal output end A2 have an equal magnitude and are in opposite directions.

It should be understood that during actual application, the phase change of the electrical signal may be changed only by adjusting distribution density of the arc-shaped segment 141 of the strip line 14, or the phase change of the electrical signal may be changed only by changing the dielectric constant of the dielectric layer 16, or the phase change of the electrical signal may be changed by adjusting both distribution density of the arc-shaped segment 141 of the strip line 14 and the dielectric constant of the dielectric layer 16, provided that the second electrical signal output by the first signal output end A1 and the second electrical signal output by the second signal output end A2 are phase-symmetrical.

Figure 15:
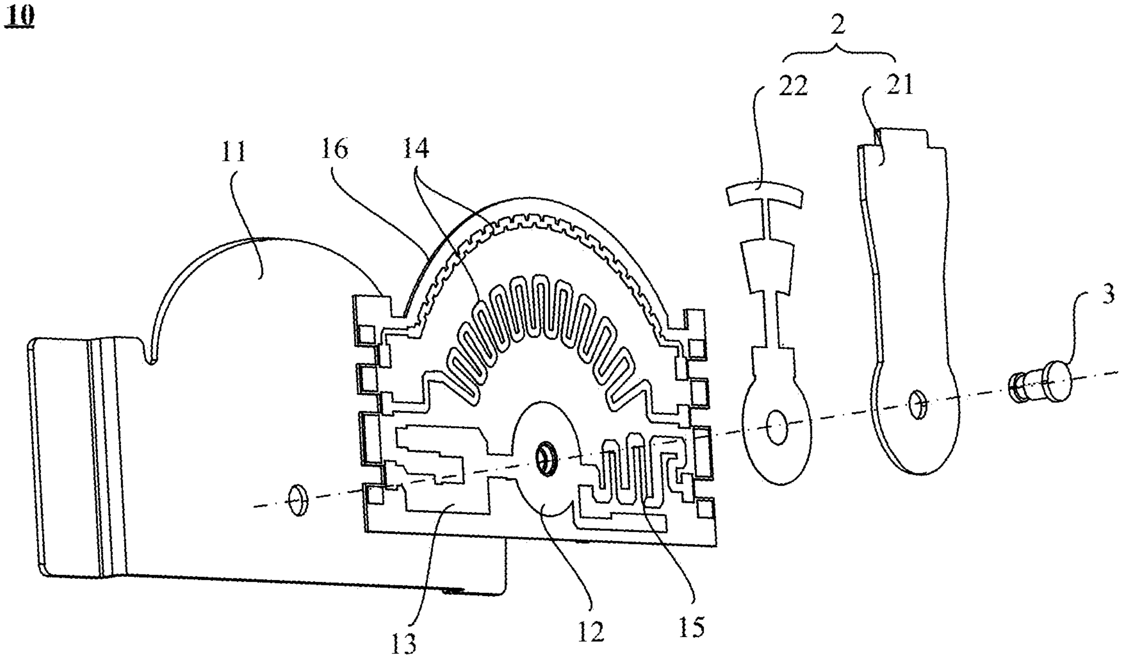
FIG. 15 is an exploded view of a phase shifter according to an embodiment of this application.

FIG. 15 is an exploded view of a phase shifter 10. The swing arm component 2 includes a coupling swing arm 21 and a coupling circuit 22, and the coupling circuit 22 is specifically disposed on a side that is of the coupling swing arm 21 and that faces the substrate 11. A central shaft 3 passes through the coupling swing arm 21, the coupling circuit 22, and the dielectric layer 16 in sequence, and then is fastened to the substrate 11. The dielectric layer 16, the coupling swing arm 21, the coupling circuit 22, and the substrate 11 each are provided with a mounting hole for the central shaft 3 to pass through. An axis of the central shaft 3, an axis of a mounting hole on the coupling swing arm 21, an axis of a mounting hole on the coupling circuit 22, an axis of a mounting hole on the dielectric layer 16, and an axis of a mounting hole on the substrate 11 are all coaxial with the rotation center O, and the central shaft 3 is equivalent to a rotation hub of the phase shifter 10.

During working, the coupling circuit 22 is connected between the coupling surface 12 and the strip line 14, and may transmit an electrical signal to each strip line 14. To implement capacitive coupling between the coupling circuit 22 and the coupling surface 12 and the strip line 14, an insulation layer is disposed between the coupling circuit 22 and the coupling surface 12, and an insulation layer is also disposed between the coupling circuit 22 and the strip line 14. Specifically, an example in which an insulation layer is disposed between the coupling circuit 22 and the strip line 14 is used. The insulation layer may be disposed on a surface that is of the coupling circuit 22 and that faces the strip line 14, or the insulation layer may be disposed on a surface that is of the strip line 14 and that faces the coupling circuit 22, or insulation layers are disposed on both a surface that is of the coupling circuit 22 and that faces the strip line 14 and a surface that is of the strip line 14 and that faces the coupling circuit 22.

When the central shaft 3 connects the coupling swing arm 2 to the phase shifter component 1, a limiting fastening part may be disposed at one end that is of the central shaft 3 and that is away from the substrate 11. The limiting fastening part may limit the coupling swing arm 2, so that the coupling swing arm 2 can swing on a surface parallel to the second direction X and the third direction Y.

Figure 16:
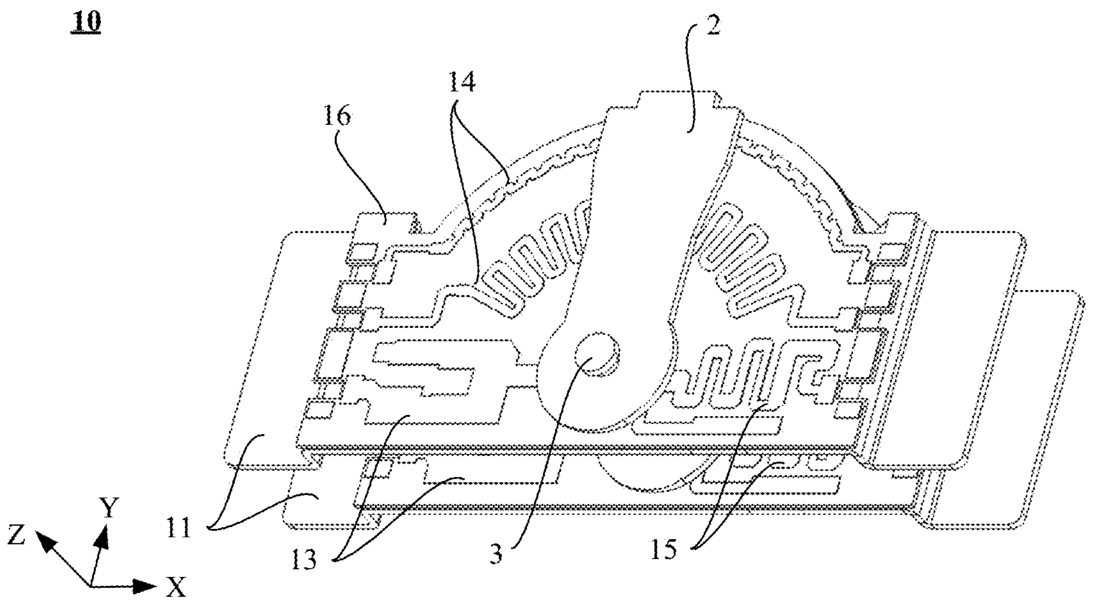
FIG. 16 is a diagram of a structure of a phase shifter according to an embodiment of this application.

As shown in FIG. 16, an embodiment of this application further provides a phase shifter 10. The phase shifter 10 includes a plurality of phase shifter components 1, the plurality of phase shifter components 1 are stacked in a first direction Z, and the first direction Z is perpendicular to the substrate 11. Corresponding to the plurality of phase shifter components 1, there are also a plurality of swing arm components 2, and the plurality of swing arm components 2 are installed on the plurality of phase shifter components 1 in a one-to-one correspondence by using the central shaft 3, that is, one swing arm component 2 is correspondingly installed on each phase shifter component 1. Certainly, it may also be considered that the structure shown in FIG. 16 is a combination of the plurality of phase shifters 10 along the first direction Z.

During actual working, each swing arm component 2 needs to be driven to rotate around the central shaft 3. When swing arm components 2 in the plurality of phase shifters 10 have consistent motion statuses, the swing arm components 2 may be relatively fastened. In this case, the plurality of swing arm components 2 may be simultaneously driven to rotate by using one driving force.

Figure 17:
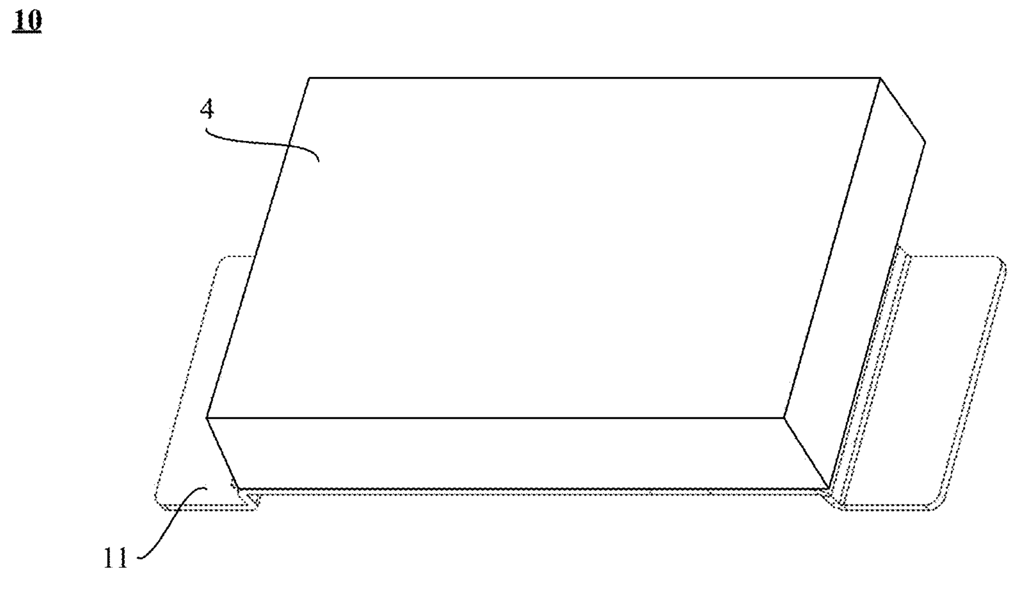
FIG. 17 is a diagram of a structure of a phase shifter according to an embodiment of this application.

In some embodiments, as shown in FIG. 17, a shielding cover 4 made of a metal material may be disposed on one side of the swing arm component 2 of the phase shifter 10. The shielding cover 4 may cover a functional component of the phase shifter 10, to shield external signal interference, and improve an electrical indicator and an inter-modulation indicator of the phase shifter 10. In FIG. 17, the shielding cover 4 covers both the swing arm component 2 and the main circuit on the substrate 11. It may be considered that the swing arm component 2 and the main circuit on the substrate 11 are functional components of the phase shifter 10.

It can be learned from the foregoing embodiments that, in the phase shifter 10 provided in embodiments of this application, a structure of the strip line 14 is improved, or the dielectric layer 16 is designed differently, or both the strip line 14 and the dielectric layer 16 are improved, so that a phase difference between a second electrical signal output by a first signal output end A1 of each strip line 14 and a second electrical signal output by a second signal output end A2 is symmetrical. In this way, phase difference symmetry of the phase shifter 10 can be improved. When the signal input end A0 is disposed on a side of any signal output end, a size of the phase shifter 10 can be reduced, thereby reducing space occupied by the phase shifter 10.

The foregoing descriptions are merely specific implementations of this application. However, the protection scope of this application is not limited thereto. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A system, comprising:

a phase shifter comprising:
- a substrate,
- a coupling surface, a main feeder, and a strip line disposed on the substrate, wherein one end of the main feeder is electrically connected to the coupling surface, another end of the main feeder is a signal input end, and the signal input end is configured to receive a first electrical signal, and
- the strip line has an arc-shaped segment and two signal output ends located at two ends of the strip line, and the signal output ends are configured to output second electrical signals; and a swing arm mounted on the substrate, wherein:
- one end of the swing arm is electrically connected to the coupling surface, and another end of the swing arm is electrically connected to the arc-shaped segment of the strip line, and
- based on a phase of the first electrical signal received by the signal input end, phase changes of the second electrical signals output by the two signal output ends have an equal magnitude and are in opposite directions.

2. The system according to claim 1, wherein:

the arc-shaped segment is distributed in a serpentine structure; and a path length of the arc-shaped segment in a unit center angle gradually increases or decreases in an arc extension direction of the arc-shaped segment.

3. The system according to claim 2, wherein:

a bending depth of the serpentine structure of the arc-shaped segment is even; and a spacing of the serpentine structure of the arc-shaped segment gradually increases or decreases in the arc extension direction of the arc-shaped segment.

4. The system according to claim 2, wherein:

a spacing of the serpentine structure of the arc-shaped segment is even; and a bending depth of the serpentine structure of the arc-shaped segment gradually increases or decreases in the arc extension direction of the arc-shaped segment.

5. The system according to claim 2, wherein:

a dielectric layer is disposed between the strip line and the substrate; and a dielectric constant of the dielectric layer gradually increases or decreases in the arc extension direction of the arc-shaped segment.

6. The system according to claim 1, wherein the signal input end and one of the signal output ends are located on a same side.

7. The system according to claim 6, further comprising a center phase output line disposed on the substrate, wherein one end of the center phase output line is connected to the coupling surface, and the other end of the center phase output line is a center phase output end.

8. The system according to claim 7, wherein the center phase output end is located on a side of the coupling surface that is away from the signal input end.

9. The system according to claim 7, wherein a lightning protection circuit is disposed on the coupling surface and/or the center phase output line.

10. The system according to claim 1, wherein:

the strip line comprises at least two strip lines located on a same side of the coupling surface;

respective arc-shaped segments of the strip lines have different radii; and between any two adjacent strip lines of the at least two strip lines, a path length of an arc-shaped segment close to the coupling surface is greater than a path length of an arc-shaped segment away from the coupling surface.

11. The system according to claim 1, wherein the main feeder is provided with a filter circuit.

12. The system according to claim 1, wherein:

the swing arm comprises a coupling swing arm and a coupling circuit disposed on a side of the coupling swing arm that faces the substrate; and the coupling swing arm is rotatably mounted on the substrate, a rotation center of the coupling swing arm is coaxial with a circle center of the arc-shaped segment, the coupling circuit is electrically connected to the coupling surface, and another end of the coupling circuit is electrically connected to the arc-shaped segment of the strip line.

13. The system according to claim 12, wherein an insulation layer is disposed on a surface of the coupling circuit that faces the strip line and/or a surface of the strip line that faces the coupling circuit.

14. The system according to claim 1, further comprising a central shaft, wherein the central shaft is coaxially fastened to the substrate and is coaxial with a circle center of the arc-shaped segment, and the swing arm is rotatably mounted on the central shaft.

15. The system according to claim 1, wherein:

the phase shifter comprises a plurality of phase shifters stacked in a first direction perpendicular to the substrate; and the swing arm comprises a plurality of swing arms mounted on each phase shifter of the plurality of phase shifters in a one-to-one correspondence.

16. The system according to claim 15, wherein the swing arms are relatively fastened.

17. A base station antenna, comprising:

a plurality of radiating elements;

an adjustment apparatus;

a phase shifter comprising:

a phase shifter component comprising:

a substrate, a coupling surface, a main feeder, and a strip line disposed on the substrate, wherein one end of the main feeder is electrically connected to the coupling surface, another end of the main feeder is a signal input end, and the signal input end is configured to receive a first electrical signal, and the strip line has an arc-shaped segment and two signal output ends located at two ends of the strip line, and the signal output ends are configured to output second electrical signals; and a swing arm mounted on the substrate, wherein one end of the swing arm is electrically connected to the coupling surface, and another end of the swing arm is electrically connected to the arc-shaped segment of the strip line, wherein based on a phase of the first electrical signal received by the signal input end, phase changes of the second electrical signals output by the two signal output ends have an equal magnitude and are in opposite directions, wherein the signal output ends are configured to be connected to radiating elements of the plurality of radiating elements in a one-to-one correspondence, and the adjustment apparatus is configured to drive the swing arm to rotate around a rotation center.

18. The base station antenna according to claim 17, further comprising a functional module, wherein the functional module is connected to the signal input end.

19. The base station antenna according to claim 18, wherein the functional module comprises one or a combination of at least two of a combiner, a filter, and a microwave circuit.

20. A base station, comprising:

a pole;

a baseband processor; and the base station antenna according to claim 17, wherein the base station antenna is fastened to the pole, and the base station antenna is electrically connected to the baseband processor through a radio frequency circuit.

* * * * *